(12) United States Patent
Ball

(10) Patent No.: US 9,671,094 B2
(45) Date of Patent: Jun. 6, 2017

(54) LASER SCANNING APPARATUS AND METHOD OF USE

(75) Inventor: Stephen Leslie Ball, Ripon (GB)

(73) Assignee: RENISHAW PLC, Wotton-under-Edge (GB)

( * ) Notice: Subject to any disclaimer, the term of this patent is extended or adjusted under 35 U.S.C. 154(b) by 0 days.

(21) Appl. No.: 13/704,779

(22) PCT Filed: Jul. 21, 2011

(86) PCT No.: PCT/GB2011/001090
§ 371 (c)(1),
(2), (4) Date: Dec. 17, 2012

(87) PCT Pub. No.: WO2012/010839
PCT Pub. Date: Jan. 26, 2012

(65) Prior Publication Data
US 2013/0088872 A1  Apr. 11, 2013

Related U.S. Application Data

(60) Provisional application No. 61/366,807, filed on Jul. 22, 2010.

(51) Int. Cl.
*F21V 21/002* (2006.01)
*G01C 11/02* (2006.01)
(Continued)

(52) U.S. Cl.
CPC .......... *F21V 21/002* (2013.01); *G01C 11/025* (2013.01); *G01C 15/002* (2013.01);
(Continued)

(58) Field of Classification Search
CPC ........................................................ G01C 3/08
(Continued)

(56) References Cited

U.S. PATENT DOCUMENTS

| 5,255,065 A | 10/1993 | Schwemmer |
| 5,367,371 A | 11/1994 | Krawczyk |

(Continued)

FOREIGN PATENT DOCUMENTS

| DE | 44 34 042 A1 | 3/1996 |
| DE | 197 57 849 A1 | 12/1997 |

(Continued)

OTHER PUBLICATIONS

Office Action issued in Chinese Patent Application No. 201180032086.0 dated May 5, 2014 (with translation).

(Continued)

*Primary Examiner* — Luke Ratcliffe
(74) *Attorney, Agent, or Firm* — Oliff PLC

(57) ABSTRACT

A laser system includes a housing and a laser. The laser can be positioned in the housing such that its laser beam is transmitted at an angle and its path forms a cone as the housing rotates. The laser device may also contain two or more lasers, the angle of each laser may be the same or different, and the angular position of each laser may be fixed or variable. The laser system may be stationary or mobile and used in a variety of methods to detect an object or topography and produce a three dimensional image. That information can be further used to provide maps, terrain data, volumetric measurements, landing guidance, obstacle avoidance warnings, mining profiles and other useful material.

30 Claims, 14 Drawing Sheets

(51) Int. Cl.
  *G01C 15/00* (2006.01)
  *G01S 7/481* (2006.01)
  *G01S 17/42* (2006.01)
  *G01S 17/89* (2006.01)
  *G02B 26/10* (2006.01)

(52) U.S. Cl.
  CPC .......... *G01S 7/4815* (2013.01); *G01S 7/4817* (2013.01); *G01S 17/42* (2013.01); *G01S 17/89* (2013.01); *G02B 26/108* (2013.01)

(58) Field of Classification Search
  USPC ........................................ 362/259; 356/5.01
  See application file for complete search history.

(56) References Cited

U.S. PATENT DOCUMENTS

| | | | |
|---|---|---|---|
| 5,465,142 | A | 11/1995 | Krumes et al. |
| 5,546,217 | A | 8/1996 | Greenway |
| 5,669,581 | A * | 9/1997 | Ringer .................. 244/3.16 |
| 5,726,743 | A | 3/1998 | Krawczyk |
| 5,903,386 | A | 5/1999 | Mantravadi et al. |
| 5,970,433 | A * | 10/1999 | Oka .................. G01S 7/4811 250/559.13 |
| 6,204,916 | B1 | 3/2001 | Norita et al. |
| 6,282,256 | B1 | 8/2001 | Grass et al. |
| 6,650,407 | B2 | 11/2003 | Jamieson et al. |
| 6,665,063 | B2 | 12/2003 | Jamieson et al. |
| 6,879,419 | B2 * | 4/2005 | Richman et al. ........ 359/203.1 |
| 7,181,856 | B1 | 2/2007 | Hanchett et al. |
| 7,248,342 | B1 * | 7/2007 | Degnan .................. 356/5.01 |
| 7,450,738 | B2 | 11/2008 | Jecker et al. |
| 7,969,558 | B2 | 6/2011 | Hall |
| 8,310,653 | B2 | 11/2012 | Ogawa et al. |
| 8,675,181 | B2 | 3/2014 | Hall |
| 8,767,190 | B2 | 7/2014 | Hall |
| 2002/0005944 | A1 | 1/2002 | Pratt et al. |
| 2002/0085085 | A1 | 7/2002 | Fischer et al. |
| 2002/0154294 | A1 | 10/2002 | Hedges et al. |
| 2003/0009268 | A1 | 1/2003 | Inokuchi |
| 2003/0043058 | A1 | 3/2003 | Jamieson et al. |
| 2004/0051860 | A1 | 3/2004 | Honda et al. |
| 2004/0114205 | A1 | 6/2004 | Richman et al. |
| 2004/0233460 | A1 | 11/2004 | Ura et al. |
| 2005/0091859 | A1 | 5/2005 | Pu |
| 2005/0099617 | A1 | 5/2005 | Ohtomo et al. |
| 2005/0211882 | A1 | 9/2005 | Ohtomo et al. |
| 2006/0279727 | A1 | 12/2006 | Nichols et al. |
| 2007/0044332 | A1 | 3/2007 | Yung et al. |
| 2007/0171396 | A1 | 7/2007 | Harris et al. |
| 2007/0279615 | A1 | 12/2007 | Degnan et al. |
| 2008/0238722 | A1 | 10/2008 | Gotzig et al. |
| 2010/0256940 | A1 * | 10/2010 | Ogawa .................. G01S 7/4812 702/97 |
| 2011/0141488 | A1 * | 6/2011 | Schumacher ........ G01C 15/004 356/614 |

FOREIGN PATENT DOCUMENTS

| | | |
|---|---|---|
| DE | 10 2004 014 041 A1 | 3/2004 |
| DE | 10 2005 019 233 A1 | 11/2006 |
| GB | 1 494 561 | 12/1977 |
| GB | 2 342 145 A | 4/2000 |
| JP | S63-122154 U | 8/1988 |
| JP | 5-240940 | 9/1993 |
| JP | A-5-229784 | 9/1993 |
| JP | H06-127318 A | 5/1994 |
| JP | H07-248382 A | 9/1995 |
| JP | 8-110239 | 4/1996 |
| JP | 2000-121732 A | 4/2000 |
| JP | 2001-021651 A | 1/2001 |
| JP | 2001-215276 A | 8/2001 |
| JP | 2002-287069 A | 10/2002 |
| JP | 2004-340856 A | 12/2004 |
| JP | 2005-502053 A | 1/2005 |
| JP | 2005-502056 | 1/2005 |
| JP | 2005-229253 A | 8/2005 |
| JP | 2005-265570 A | 9/2005 |
| JP | 2007-505298 A | 3/2007 |
| JP | 2008-134257 A | 6/2008 |
| JP | 2008-519273 A | 6/2008 |
| JP | 2010-151682 A | 7/2010 |
| WO | 89/11107 | 11/1989 |
| WO | 03/021285 A2 | 3/2003 |
| WO | 03/021290 A2 | 3/2003 |
| WO | 2006/134729 A1 | 12/2006 |

OTHER PUBLICATIONS

Petrie, "An Introduction to the Technology Mobile Mapping Systems," *GEO Informatics*, Jan./Feb. 2010, pp. 32-43.

Oct. 15, 2013 Australian Office Action issued in Australian Application No. 2011281377.

Oct. 14, 2011 Written Opinion of the International Searching Authority issued in International Application No. PCT/GB2011/001090.

Oct. 14, 2011 International Search Report issued in International Application No. PCT/GB2011/001090.

Feb. 17, 2015 Office Action issued in Japanese Application No. 2013-520202.

Jan. 19, 2015 Office Action issued in Chinese Patent Application No. 201180032086.0.

Jul. 15, 2015 Office Action issued in Chinese Patent Application No. 201180032086.0.

Jul. 21, 2015 Office Action issued in Japanese Patent Application No. 2013520202.

Mar. 15, 2016 Decision to Decline the Amendment issued in Japanese Patent Application No. 2013-520202.

Mar. 15, 2016 Official Notice of Final Decision of Rejection issued in Japanese Patent Application No. 2013-520202.

Oct. 4, 2016 Office Action issued in Japanese Patent Application No. 2015-207515.

\* cited by examiner

LASER SCANNING APPARATUS AND METHOD OF USE

This invention relates to the field of measurement beam scanning systems and, more preferably, laser scanning systems.

A variety of measurement beam scanning systems are available for detecting or measuring. For example, the Cavity Autoscanning Laser System (C-ALS) has been sold by Measurement Devices Ltd. for measuring inaccessible voids and cavities, such as underground caverns for potential mining operations. The C-ALS has a laser head that is rotated by a pan and tilt mechanism. The laser head can be attached to a telescopic boom and lowered into a cavity through an access borehole. The laser scans the cavity as it is rotated and angled by the pan and tilt mechanism and a detailed 3D representation of the cavity produced.

Another system uses a continuously measuring laser to be directed vertically and horizontally, usually by motorized means, to vector scan surrounding objects or topography. This allows the creation of point clouds of x, y and z data from which a scaled facsimile of the object or topography may be generated, usually by computer graphics modeling techniques. Large or complex object or areas may be surveyed using this technique by scanning from multiple directions or stations and mathematically stitching the x, y, and z data to form one model. This method is well established and effective, but relatively slow. An example of such a product is Measurement Devices Ltd. Quarryman System.

Mobile scanning has also become a possibility with the introduction of high precision navigation and attitude measuring systems. In a mobile system, single or multiple scanners moving in planes with known relation offset to the axis of the mobile vehicle are used to line scan objects or topography as the vehicle passes by. In order to do this, one requires the position and trajectory of the vehicle to be accurately determined using radio, satellite or laser positional systems. The attitude, i.e., pitch, roll, yaw, heave and heading need to be determined, usually by multiaxis gyro systems. Continuous laser scanning is conducted in one or more known planes with respect to the vehicle position and trajectory. This method is faster and more efficient than stationary scanning, although it can be less accurate and more expensive. The resulting scans may have occlusions or black areas because the scanning plane is generally normal to the direction of travel. One example of such a product is the Dynascan System produced by Measurement Devices Ltd.

A number of scanning mechanisms are available, including the rocking mirror, spinning polygon mirror and spinning laser beam. These mechanisms are employed for stationary and mobile mapping systems such as the Topcon GLS-1000 (rocking mirror), Riegl V2 400 (spinning polygon mirror) and the Optech Lynx System (spinning 360 degree Prism laser beam). Each of these three mechanisms provide vertical and/or planar scans. None provide variable laser angle scanning capabilities.

A need exists for further development of laser scanning systems, preferably a system that is mobile, simple, efficient, inexpensive to produce, robust and able to accurately detect and measure objects and topography, while minimizing occlusions and shading in the 3D images produced by the system.

The present invention provides an improved beam scanning apparatus, and in particular according to a first aspect the invention there is provided a laser scanning apparatus comprising a housing comprising at least one laser, in which the apparatus is configured to emit at least first and second laser beams from the housing, the at least first and second laser beams being rotatable about a common axis of rotation.

As the beams are configured to rotate about a common axis, it is much easier to tie together the data from the scans they provide into a common coordinate system. This can also therefore reduce the complexity of any calibration of the apparatus. Furthermore, providing at least first and second beams that are rotatable about a common axis of rotation enables multiple scans, along multiple paths, to be obtained with the use of only a single scanning head.

The apparatus can be configured such that the path of at least one of the first and second laser beams is in the shape of a cone when it moves about the axis of rotation. Accordingly, at least one of the first and second laser beams can be projected at a non-perpendicular angle to the common axis of rotation. For example, at least one of the first and second laser beams can be projected at an acute angle of between 80° and 5°, more preferably between 70° and 10°, for example between 60° and 20°, relative to the common axis of rotation.

The apparatus could comprise one laser only. For instance, at least one optical component could be used to create the at least first and second laser beams from a beam emitted by the one laser. In this case, at least one of the at least one optical components could be configured to rotate so as to cause the at least first and second laser beams to rotate about the common axis.

Each laser beam emitted from the housing could be generated by its own laser. Optionally, the apparatus can comprise at least first and second lasers for generating the at least first and second laser beams. The at least first and second lasers can be configured to rotate about a common axis so as to cause the laser beams to rotate about a common axis.

The at least first and second lasers can be rotationally fixed relative to each other. For example, the first and second laser beams could be configured such that they cannot rotate relative to each other about their common axis of rotation. The at least first and second lasers could be fixed relative to each other, such that they cannot move relative to each other.

The housing can be rotatable about an axis of rotation. The laser scanning apparatus could be configured such that the at least first and second laser beams are configured to rotate with the housing. Accordingly, the at least first and second laser beams could be rotationally fixed relative to the housing. The at least first and second laser beams could be fixed relative to the housing. At least one of the first and second lasers can be positioned in the housing at an angle such that the path of its laser beam is in the shape of a cone when the housing moves about its axis of rotation. In particular, at least one of the first and second lasers can be positioned in the housing at a non-perpendicular angle relative to the common axis of rotation. The at least first and second lasers can be positioned in the housing at an angle such that the path of their laser beams are each in the shape of a cone when the housing moves about its axis of rotation.

At least one of the first and second laser beams could be configured to rotate about the common axis such that its path is contained within a plane as it rotates about the common axis. Accordingly, the second laser beam could be emitted from the housing such that its path extends perpendicularly to the common axis of rotation. Both of the first and second laser beams could be configured to rotate about the common axis such that their paths are each contained within a plane as they rotate about the common axis. Accordingly, the first and second laser beams could be configured to be contained within parallel planes as they rotate about the common axis. Optionally, the first laser beam can be rotatable about the common axis of rotation such that its path is in the shape of a cone when it moves about the axis of rotation, and the second laser beam can be rotatable about the common axis of rotation such that its path is also in the shape of a cone when it moves about the axis of rotation. Preferably, the cone of the second laser beam is different to that of the first laser beam. Accordingly, the first and second laser beams can be projected at a non-perpendicular angle to the common axis of rotation. Accordingly, at least two of the laser beams emitted from the housing can rotate about the common axis such that their paths are in the shape of a cone. Accordingly, the first and/or second laser beams can be projected at an acute angle between 80° and 5°, more preferably between 70° and 10°, for example between 60° and 20°, relative to the common axis of rotation. As will be understood, the at least first and second beams could be projected at different angles relative to the common axis. Optionally, the at least first and second beams could be projected at the same angle. In this case different conical paths could be obtained by the first and second beams being projected at different points along the length of the common axis, and/or in different directions (e.g. backwards and forwards).

The apparatus can be configured such that the at least two cones defined by the rotation of the at least first and second beams face in different directions. For example, the at least two cones could face in opposite directions, e.g. diametrically opposed directions. For example, the first and second cones (respectively defined by the rotation of the first and second beams about the common axis of rotation) could face forwards and backwards (or upwards and downwards).

The at least first and second beams could be emitted simultaneously. The at least first and second beams could be emitted continuously. As will be understood, this need not necessarily be the case. For instance, the at least first and second beams could be emitted alternately as they rotate about the common axis of rotation. This could be the case, for example, when the first and second laser beams are generated from a common laser.

The reflection, e.g. the backscattering, of the at least first and second beams (e.g. from objects in the vicinity of the apparatus) could be detected by a single detector in the housing. Optionally, a plurality of detectors are provided. For instance, optionally the apparatus comprises, for each of the at least first and second laser beams, at least one associated detector configured to detect backscattering of the laser beam. Optionally, the at least one detector could be configured to rotate, for example about the common axis of rotation. Accordingly, the at least one detector could be configured to rotate about the common axis of rotation at the same rate as the at least first and/or second beam rotates about the common axis. For example, in embodiments in which the housing rotates, the at least one detector could be configured to rotate with the housing. Accordingly, the at least one detector could be rotationally fixed relative to the housing. The at least one detector could be fixed relative to the housing.

At least one of the at least first and second beams could be projected at a steady, i.e. constant, angle with respect to the common axis of rotation as it is rotated about the at least one common axis. Optionally, both of the at least first and second beams could be projected at a steady, i.e. constant, angle with respect to the common axis of rotation as it is rotated about the common axis of rotation.

Preferably the cross-sectional area of at least one of the at least first and second beams is substantially constant along its length. Preferably the cross-sectional area of the at least first and second beams is substantially constant along their length. In other words, preferably at least one of the at least first and second beams does not diverge or converge along its length. Preferably the at least first and second beams do not diverge or converge along their length.

As will be understood, at least one additional beam, for instance at least a third beam, could be emitted from the housing. As will be understood, the statements made above and below in connection the at least first and second laser beams also apply to any additional laser beams. For example, at least one of the at least one additional beam could be configured to rotate about the common axis of rotation. At least one of the at least one additional beam could be configured to rotate about the common axis such that its path stays within a plane. Optionally, at least one of the at least one additional beam could be configured to be rotatable about the common axis of rotation such that its path is also in the shape of a cone when it moves about the axis of rotation.

As will be understood, the apparatus has many suitable applications. For instance, the apparatus could be used to detect and/or measure at least one object. In particular it can be used to determine the distance between at least one object and the apparatus, in particular the housing. For instance, the apparatus could be configured to measure the surroundings in which the apparatus is located. For instance, the apparatus could be used to generate a computer generated 3-dimensional (3D) topographical model of the surroundings in which the apparatus is located. Accordingly, the apparatus could comprise at least one processor device configured to process the detected reflected beams to determine the distance to at least one object. The processor could be configured to determine the time it has taken for the laser beam to reach the at least one object and then be reflected back again to the detector. Accordingly, the apparatus could be what is commonly known as a time-of-flight laser scanning apparatus. The at least first and second beams could comprise a continuous series of laser pulses. In this case, the apparatus could be configured to determine the time taken for backscattered pulses to be detected by at least one detector in the housing. Accordingly, the apparatus could be what is commonly known as a pulsed time-of-flight laser scanning apparatus. Lasers suitable for use with the present invention include those that emit laser beams in the ultraviolet to infrared range. For example, the laser(s) for generating the at least first and second laser beams could emit infra red light, for instance light in the near or short-wavelength infrared range (for instance in the range of 850 nm to 1550 nm).

The apparatus could be configured to use a series of measurements of the distance between the housing and at least one object, with information about the laser beam's emission position and direction for each of the measurements, to create a cloud of measurement points. Accordingly, the cloud of measurement points can represent the topography of the surroundings in which the housing is located. The apparatus, for instance the processor, could be configured to tie together measurement data obtained from the detection of the backscattering of each of the at least first and second beams.

As will be understood, the apparatus can comprise positional instrumentation to enable the position of the housing (and for instance the common axis of rotation) to be determined in at least one dimension, preferably in at least two orthogonal dimensions, more preferably in at least three orthogonal dimensions. For instance, the housing can comprise a triangulation positioning system unit which enables the location of the housing (and for instance the common axis of rotation) to be determined via triangulation. This could be a local system, for instance at least three transmitter/receiver units could be located in the vicinity of the housing to which transmit to the housing/receive from the housing at least three triangulation signals. The triangulation system could be a regional or even a global system. For example the housing could comprise a satellite positioning system unit which receives signals from satellites to enable such as a Global Positioning System (GPS) unit. Positional instrumentation can also include for example, motion sensors, inertial sensors, accelerometers, gyroscopes, altimeters, etc.

The apparatus can comprise orientation instrumentation in order to enable the rotational orientation of the housing (and for instance the common axis of rotation) about at least one axis to be determined, more preferably about at least two orthogonal axes, especially preferably about at least three orthogonal axes. For instance, the housing could comprise a compass, at least one accelerometer, at least one inclinometer, and/or at least one gyroscope. Of course, such instrumentation could also or instead be used to determine the position of the housing (and for instance the common axis of rotation). The housing could comprise an inertial measurement unit.

Accordingly, the apparatus can comprise such instrumentation to enable the position and/or direction of emission of the at least first and second laser beams to be determined at any particular instant in time. Furthermore, the apparatus, for example the housing, could comprise at least one rotational encoder. The rotational encoder could be used to determine the rotational position of the beam about the common rotational axis at any instant in time.

Each of the at least first and second laser beams could be configured to rotate about a common bearing. Each of the at least first and second laser beams could be caused to rotate about a common axis of rotation by a common rotation device that rotates about an axis. For example, at least first and second laser beam generation components (e.g. first and second lasers, or first and second beam splitters), could be mounted to a common rotation unit which is configured to rotate about an axis of rotation. For instance, in embodiments in which the housing rotates, then the common rotation unit could be the housing.

The present invention also provides an improved method of scanning using a beam scanning apparatus, comprising a housing from which at least first and second beams are emitted from the housing, the method comprising: rotating the at least first and second beams about a common axis. For example, the method could comprise rotating the at least first and second beams about a common axis such that they each describe a different path, at least one of the beams describing a conical path as it rotates about the common axis.

According to a second aspect of the invention there is provided a method of scanning using a laser scanning apparatus comprising a housing from which at least first and second beams are emitted (e.g. in different directions) from the housing, the method comprising: rotating the at least first and second beams about a common axis such that they each describe a different path. At least one of the beams can describe a conical path as it rotates about the common axis.

As will be understood, features described above in connection with the apparatus of the invention are also applicable to the method of the invention, but for the sake of brevity are not repeated here. For example, the method can comprise rotating the at least first and second beams about a common axis such that they each describe a different conical path. The method can comprise rotating the housing so as to rotate the at least first and second beams about the common axis. The first and second conical paths can face in opposite directions.

The method can further comprise linearly moving the housing in a direction parallel to the axis of rotation. At least one of laser beams can describe a forward or rearward facing cone, e.g. the cone's centre line can extend substantially parallel, for example substantially co-incident, with the common axis of rotation. In embodiments in which each of the first and second laser beams describe a cone as they rotate about the axis, one of first and second laser beams can describe a forward facing cone and the other can describe a rearward facing cone. Optionally, at least one of the laser beams can describe a sideways facing cone, e.g. the cone's centre line can extend substantially perpendicularly to the common axis of rotation.

As set out in connection with the apparatus of the invention, the method of the invention can be used for many suitable applications. For example, the method can comprise determining the presence/absence of at least one object and/or measuring at least one object using the apparatus. The method can comprise using the apparatus to obtain a series of measurements of the distance between the housing (for instance the common axis of rotation) and the at least one object. The method can comprise using the series of measurements to create a cloud of measurement points. The cloud of measurement points could represent the topography of the surroundings in which the housing is located. As set out above in connection with the apparatus of this invention, this could involve using data about the at least one laser beam's emission position and direction. The method can comprise tying together measurement data obtained from detection of backscattering of each of the at least first and second beams.

According to a third aspect of the invention there is provided a method of scanning an object, comprising moving a laser scanning apparatus past the object, in which the laser scanning apparatus projects at least one laser beam at an angle relative to the direction of travel so as to extend in both forward and backward directions relative to the direction of travel as the laser scanning apparatus moves past the object.

Orienting the at least one laser beam in this manner increases the amount of data that can be obtained about the object as the laser scanning apparatus passes past the object as opposed to beam that extends perpendicular to the direction of travel. For instance, as well as scanning the side of the object that faces the laser scanning apparatus, this method ensures that front and rear faces of the object can be scanned also, even if movement of the laser scanning apparatus is contained within a plane, e.g. moved past the object in a straight line.

As will be understood, the at least one laser beam is projected at an angle with respect to the direction of motion, in particular at a non-perpendicular angle. The laser scanning apparatus could project at least two beams, one in the forward direction and another in the backward direction. The at least one beam could be a fan beam. This could be provided by a beam that diverges away from the apparatus. Optionally, this could be provided by a beam of constant cross-sectional dimension along its length that oscillates in a plane. The at least one beam could have a constant cross-sectional dimension along its length. The at least one laser beam could be rotated about an axis. The at least one laser beam could be positioned at an angle (e.g. a non-perpendicular angle) relative to the axis of rotation such that it describes a cone as it rotates about the axis of rotation. The at least one laser beam could be projected at a steady, i.e. constant, angle with respect to the common axis of rotation as it is rotated about the at least one common axis. Optionally, the at least one laser beam could be configured such that the centre line of the cone it describes as it rotates about the axis of rotation is parallel to the direction of travel. The at least one laser beam could be configured such that the centre line of the cone it describes as it rotates about the axis of rotation is at an angle with respect to the direction of travel, e.g. is substantially perpendicular to the direction of travel.

As will be understood, at least one second laser beam can be projected at an angle with respect to the direction of motion, in particular at a non-perpendicular angle. Optionally, at least one second laser beam can be angled relative to an axis of rotation such that it describes a cone as it rotates about the axis of rotation. Optionally, the at least one second laser beam could be configured such that the centre line of the cone it describes as it rotates about the axis of rotation is parallel to the direction of travel. Optionally, the at least one laser beam could be configured further such that the centre line of the cone it describes as it rotates about the axis of rotation is at an angle with respect to the direction of travel. The at least one laser beam could be configured such that the centre line of the cone it describes as it rotates about the axis of rotation is at an angle with respect to the direction of travel, e.g. is substantially perpendicular to the direction of travel.

As will be understood, features described above in connection with the apparatus and other method of the invention are also applicable to this method of the invention, but for the sake of brevity are not repeated here.

This application also describes a novel cone scanning laser system and methods for its use. "Cone scanning" is a term used herein to refer to a method of operating a laser scanning system whereby a laser is positioned at an angle within a rotating housing such that the path of the laser beam forms a cone as the housing moves about its axis of rotation. The system does not necessarily include a tilt mechanism, thereby simplifying its design and reducing the number of moving parts. The cone scanning laser system and method described herein allow users to make laser measurements, for example, to detect and describe objects or topography in three dimensions.

The term "laser system" as used herein is also commonly referred to in the industry by the term LiDAR (light detection and ranging). In the system and method according to the invention, the cone scanning angle measurements are determined using optical encoders or other similar means of measuring rotation angle triggered by the laser pulses on emission and return. Collected cone scanning laser and angle data is registered and time tagged together with the navigation and attitude data to determine the 3D coordinates of the laser point clouds which are processed (real time or by later post processing) to produce 3D images or maps.

This application describes a cone scanning laser system, comprising: a) a housing that moves about an axis of rotation; and b) a laser positioned in the housing at an angle such that the path of its laser beam is in the shape of a cone when the housing moves about its axis rotation. For example, one embodiment of the invention is a cone scanning laser system comprising a rotating housing and a laser, wherein the laser is positioned in the housing such that its laser beam is transmitted at an angle and its path forms a cone as the housing moves about its axis of rotation. The position of the laser within the housing may be fixed or, alternatively, the position of the laser within the housing may be variable such that the laser can be transmitted at different angles.

Another embodiment of the invention is a cone scanning laser system comprising two or more lasers held within a rotating housing. At least one of the lasers is positioned such that it is transmitted at an angle. As the housing rotates, the path of the angled laser beam is in the shape of a cone. Such a cone scanning laser device can have a number of different configurations. For example, a cone scanning laser system may comprises three lasers held in a rotating housing device, wherein a first laser is positioned at an upward angle, a second laser is positioned at a horizontal angle, and a third laser is positioned at a downward angle. In another example, two or more lasers positioned at different angles are held in a rotating housing and the operator can select any or all angled laser or lasers to scan as the housing moves about its axis of rotation.

The cone scanning laser systems according to the invention can be part of a stationary or mobile system. For example, one embodiment of the invention is a cone scanning laser system that operates from a fixed location to detect and describe objects or topography in three dimensions. The cone scanning laser system comprises a rotating housing at a stationary location and a laser, wherein the laser is positioned in the housing such that its laser beam is transmitted at an angle and its path forms a cone as the housing moves about its axis of rotation.

In another example, the cone scanning laser system according to the invention may be attached to a rotation or panning mechanism. For example, the cone scanning laser system may be attached to a rotating pan on top of a tripod. As the laser rotates while the housing moves about its axis of rotation, the cone scanning laser system may be further rotated on the panning mechanism.

An additional preferred embodiment of the cone scanning laser system according to the invention is a scanning system that could improve upon or compliment the CAL-S system. While the C-ALS has many benefits, it also has potential shortcomings in dealing with irregular shaped cave surfaces that may result in blindspots to the laser scanning system. Additionally, the access to a cavity may be such that the C-ALS is lowered on the telescopic boom for a great distance or at an awkward angle that may cause the laser head to get stuck. It would also be beneficial to have a simpler system with fewer moving parts, less weight, greater resistance to water and a lighter and more robust laser head.

A cone scanning laser system according to the invention, for example, is a cone scanning laser device attached to the end of a boom lowered into an underground cavity. The cone scanning laser system operates to determine the topography of the cavity and produce a 3D map of the cavity. Preferably, the cone scanning laser system according to this embodiment has multiple lasers positioned at different angle within the housing to capture data including irregularly shaped surfaces throughout the cavity.

As another embodiment of the present invention, is a mobile cone scanning laser system that detects and describes objects or topography in three dimensions. A particular example of a mobile laser scanning system is a cone scanning laser system attached to a vehicle that detects obstacles in the path of the vehicle. In the context of this invention, the moving vehicle can be any land, sea or air vehicle, including but not limited to an airplane, helicopter, automobile, motorcycle, military vehicle or boat. In a preferred embodiment, the cone scanning laser system is attached to a vehicle to gather data to determine potential landing sites. Another example is a mobile cone scanning laser system affixed to a moving vehicle wherein the cone scanning system gathers information regarding objects and topography in three dimensions.

Besides the embodiments related to the cone scanning laser device or system, the invention is further directed to methods of conducting a cone scanning operation. For example, in a preferred embodiment is a method of describing an object or topography in three dimensions by scanning the object or topography with a cone scanning laser system according to the invention.

In another preferred embodiment is a method of detecting an obstacle in the path of a moving vehicle by scanning the area adjacent to the moving vehicle with a cone scanning laser system.

In a further preferred embodiment, is a method of locating a suitable helicopter landing area which comprises operating a cone scanning laser system attached to the helicopter, wherein the land area below and adjacent to the helicopter is subjected to cone scanning to detect objects and topography and determine a suitable landing area.

In another preferred embodiment is a method of detecting the presence or volume of a material or toxic substance by scanning an area potentially containing the material or toxic substance with a cone scanning laser system according to the invention.

Information gathered from any stationary or mobile cone scanning laser system or method according to the invention may be further used to prepare or provide location information, maps, terrain data, volumetric measurements, other navigation or route guidance. The information may also provide images of buildings, structures, landforms, terrain, geographic formations, waterways, natural resources, or other objects. The information may further be used to identify traffic patterns, weather conditions, boundaries, obstacles, road conditions or events. That information may also be used to identify the presence, approach or retreat of moving objects, weapons, vehicles, persons, or animals.

Another preferred embodiment of the stationary or mobile laser scanning system or method according to the invention is to provide a cone scanning laser system that is, relative to existing laser scanning systems, more accurate, fast, reliable, lightweight, economical, robust, and/or watertight. Preferably the cone scanning laser system has a simpler design, e.g., through the use of fewer angles of rotation for the laser housing.

Embodiments of the invention will now be described, by way of example only, with reference to the accompanying figures, in which.

Figure 3:
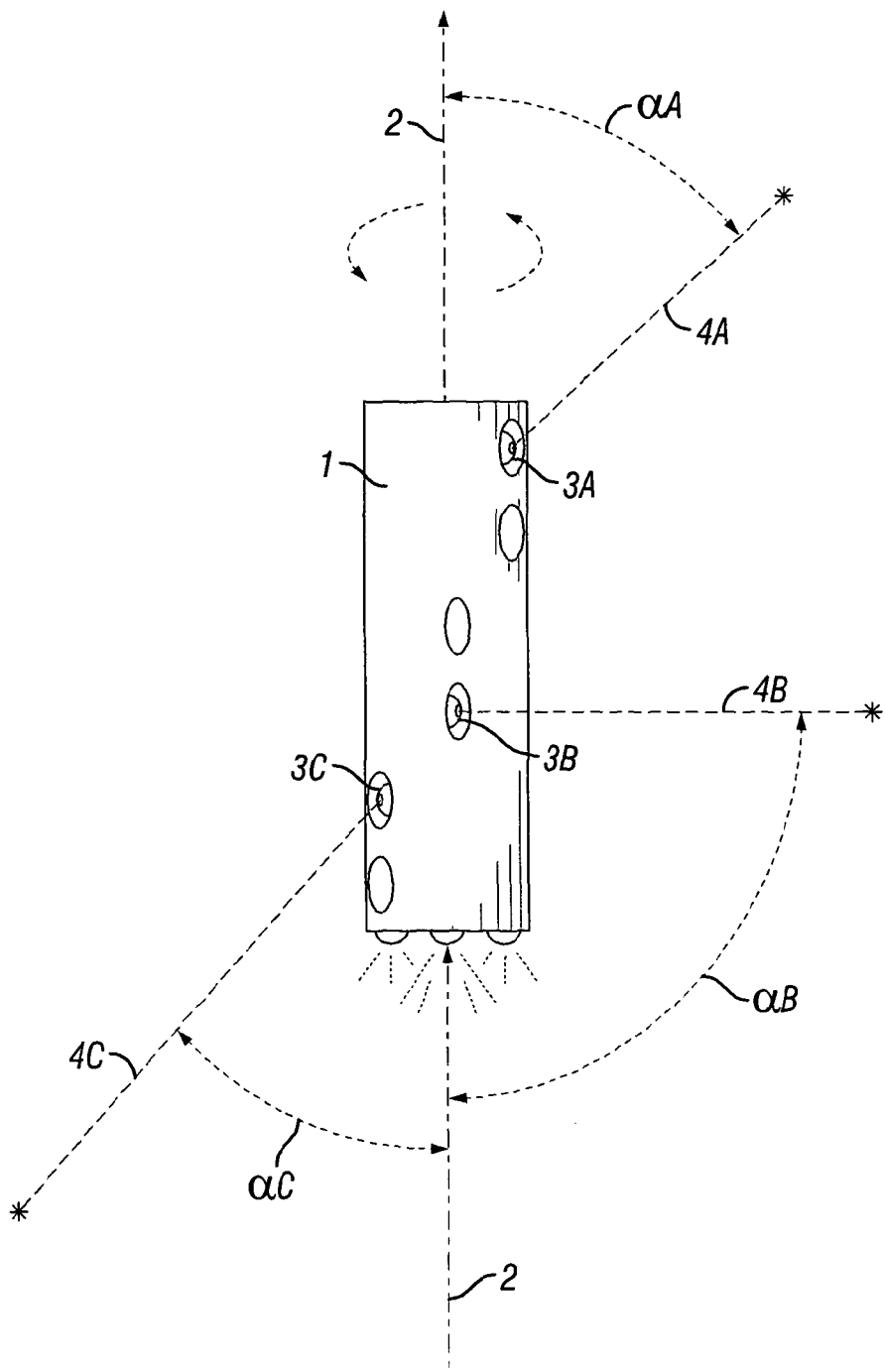
FIG. 3 is a diagram of another preferred embodiment of a laser scanning system according to the invention with three lasers positioned at upward, horizontal and downward angles relative to the axis of rotation.
Figure 4:
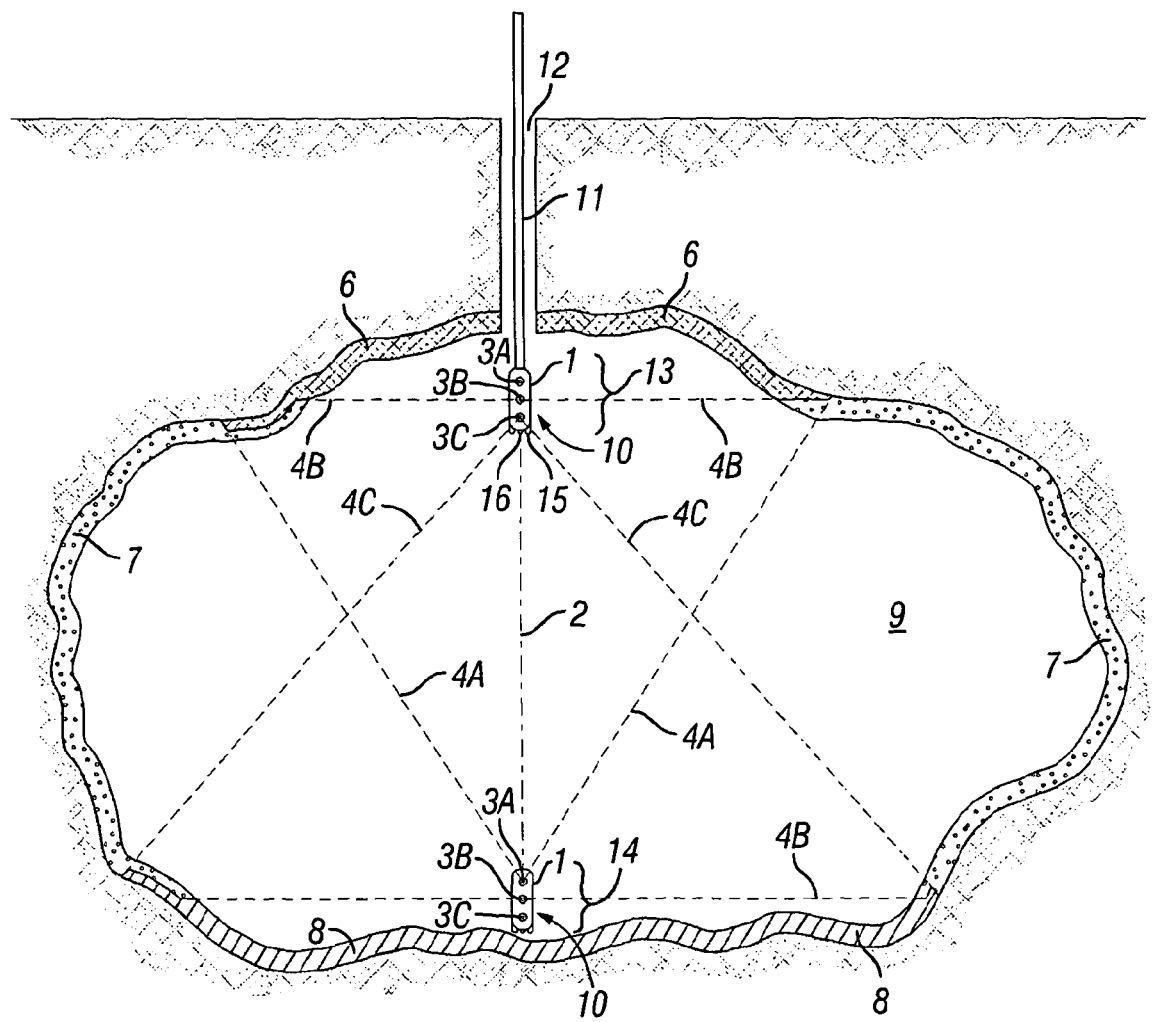

FIG. 4 is a diagram of the laser scanning system according to the invention from FIG. 3 attached to a rod and lowered through a borehole into a cavity. Once inside the cavity, the cone scanning laser device performs a cone scanning of the cavity and obtains a three dimensional image of the cavity topography. During cone scanning, the housing moves about its axis of rotation while it is lowered down into the cavity. Onboard sensors (navigation system) monitor and correct for the pitch roll and yaw of the laser relative to the start point. The diagram shows a snapshot of the paths of the three cone scanning lasers and the overall areas of the cavity scanned by each respective laser.

Figure 5:
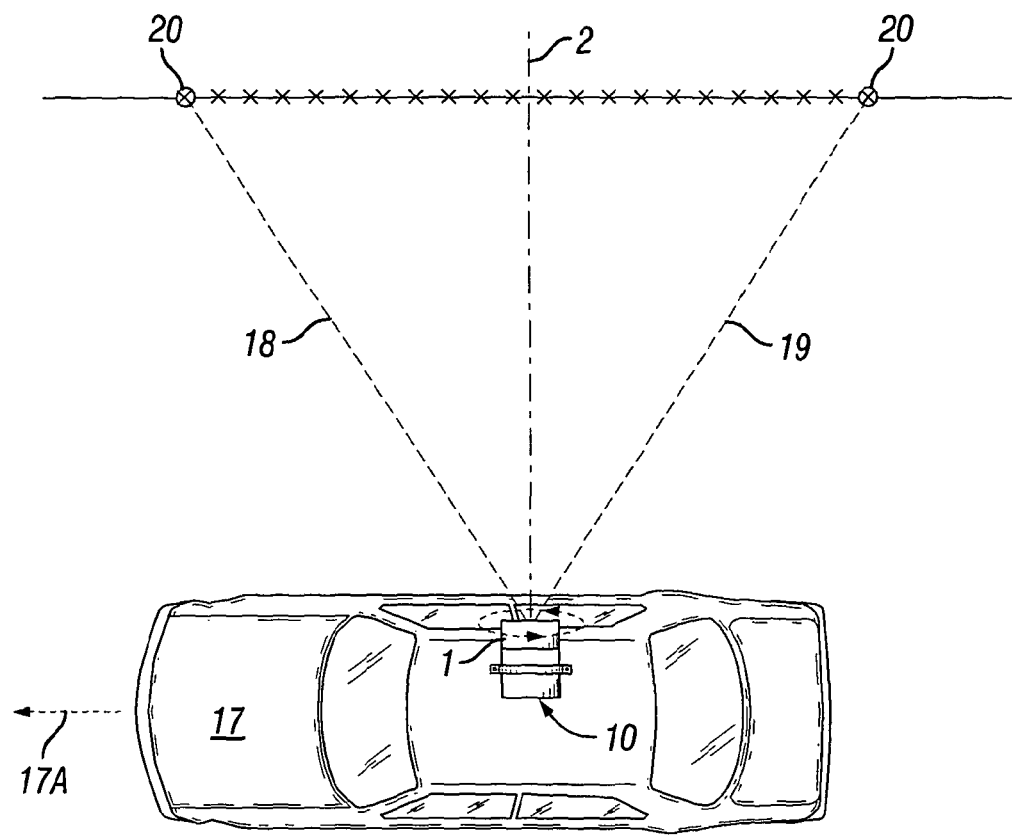

FIG. 5 is a side view diagram of a preferred embodiment of a mobile cone scanning laser system according to the invention.

Figure 6:
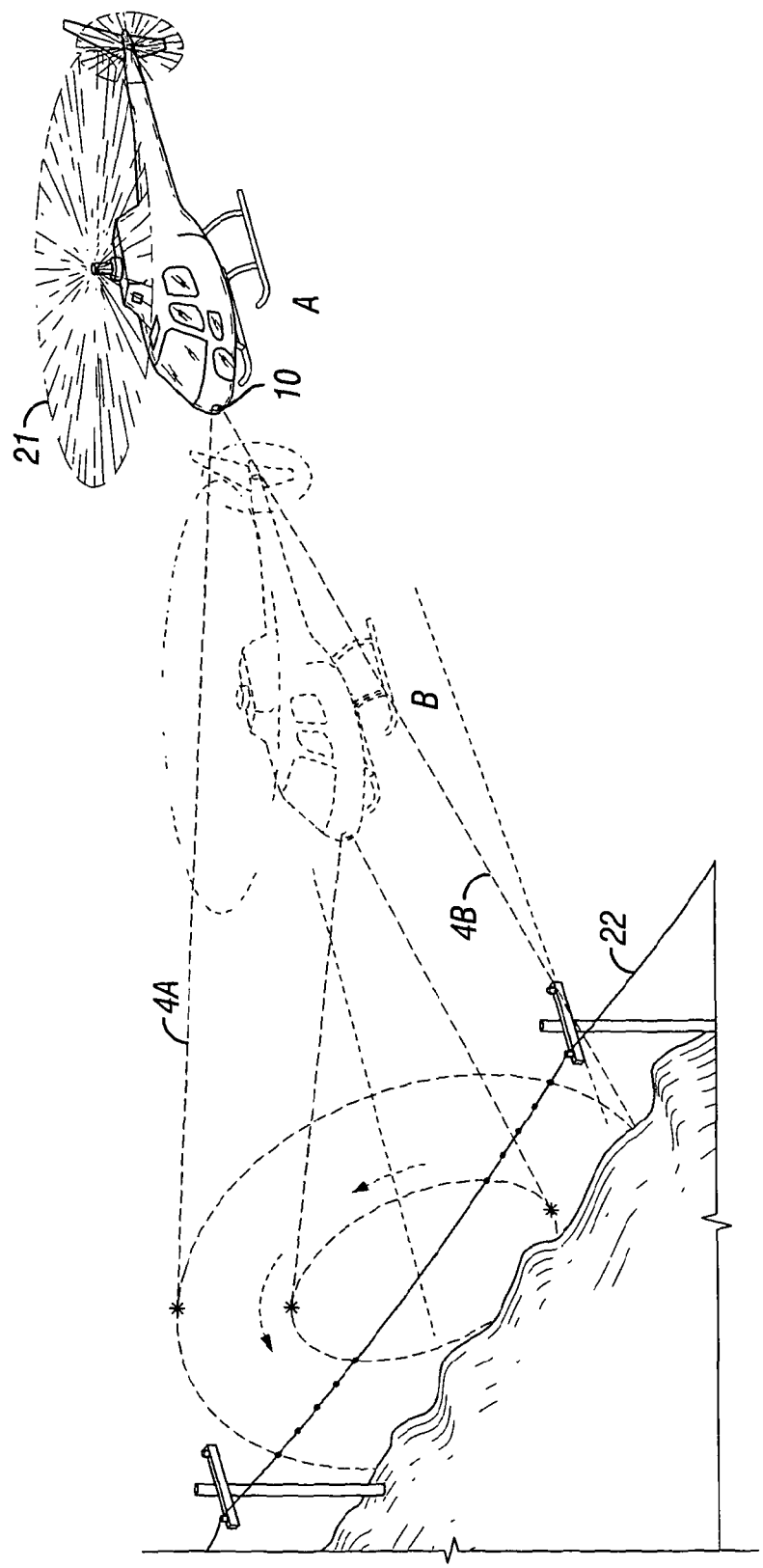

FIG. 6 is a diagram of a mobile laser scanning system according to the invention on a helicopter, wherein the cone scanning laser system detects a cable suspended in the air.

Figure 7:
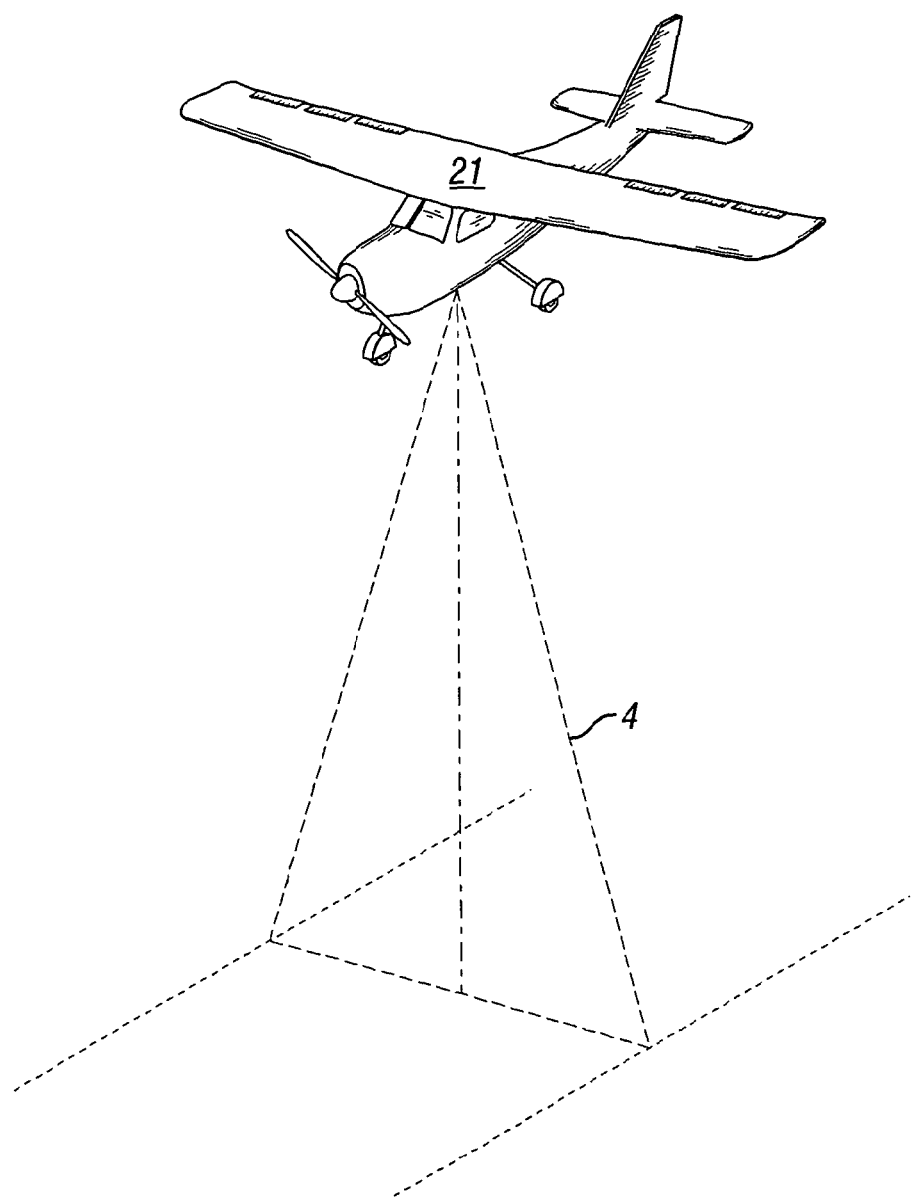

FIG. 7 is a diagram of a prior art conventional line scanner on an aircraft.

Figure 8:
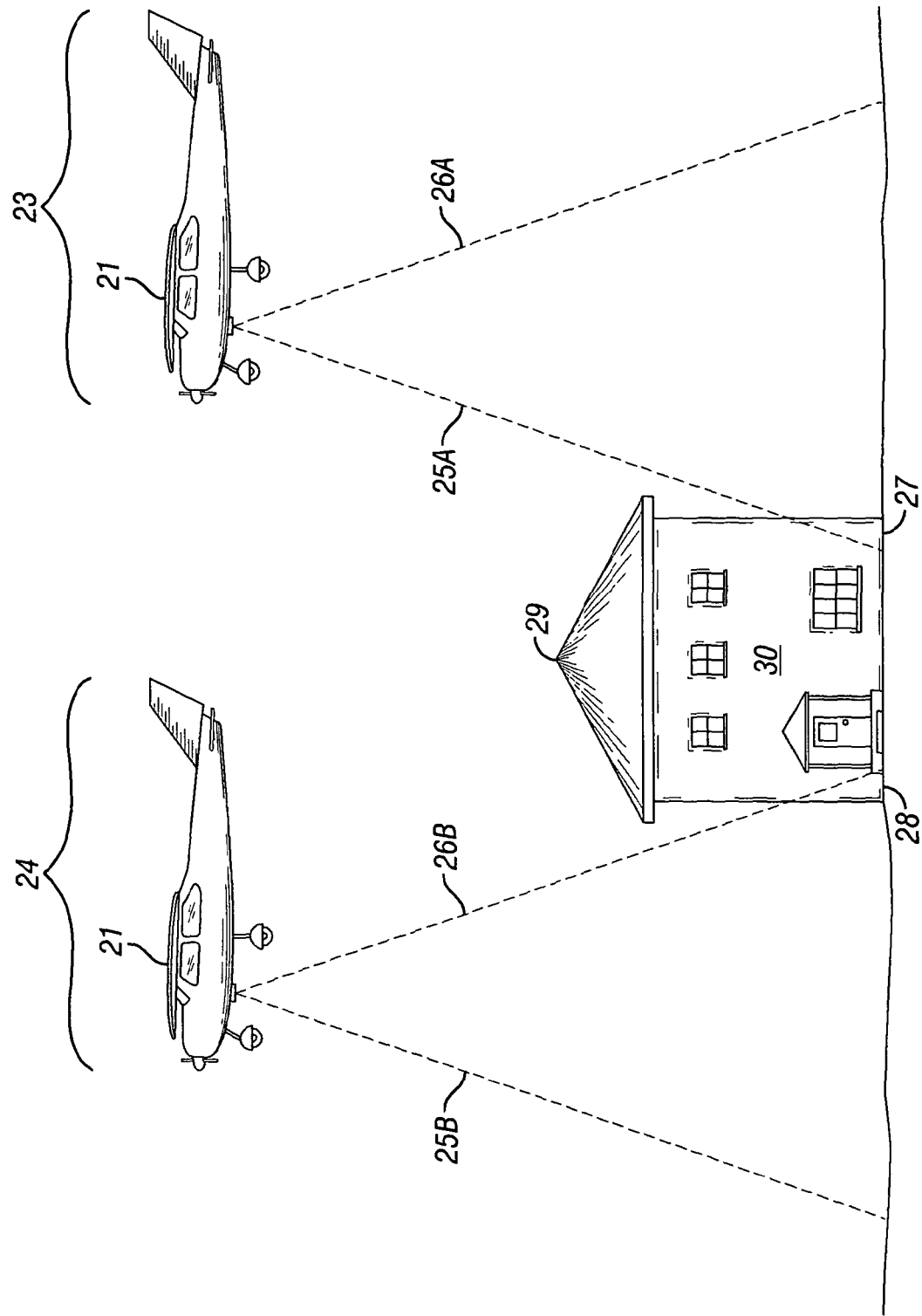

FIG. 8 is a diagram of a laser scanning system according to the invention on an aircraft.

Figure 9:
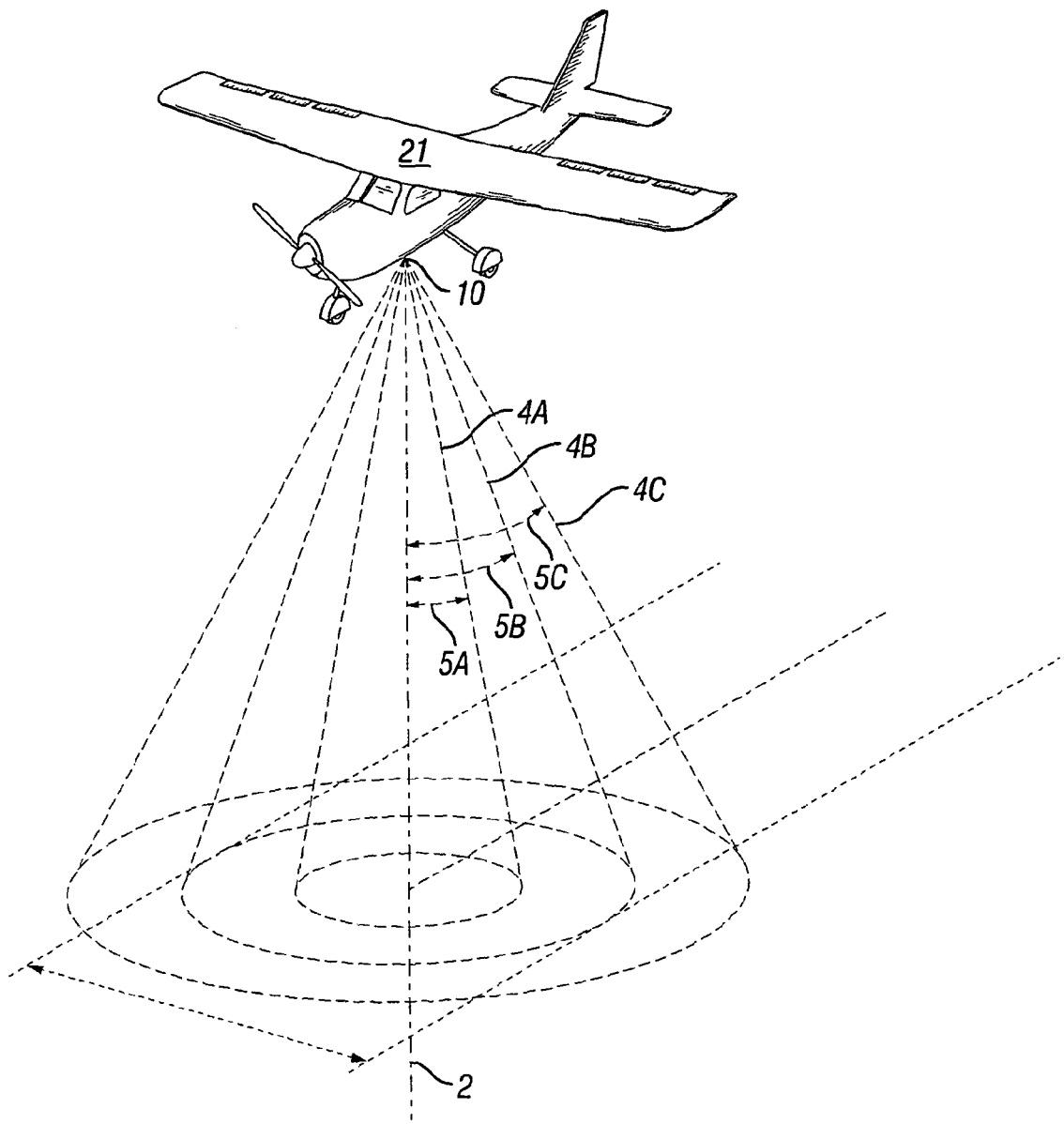

FIG. 9 is a diagram of a laser scanning system according to the invention on an aircraft, wherein a variable cone angle mechanism may be used to guide the laser.

Figure 10:
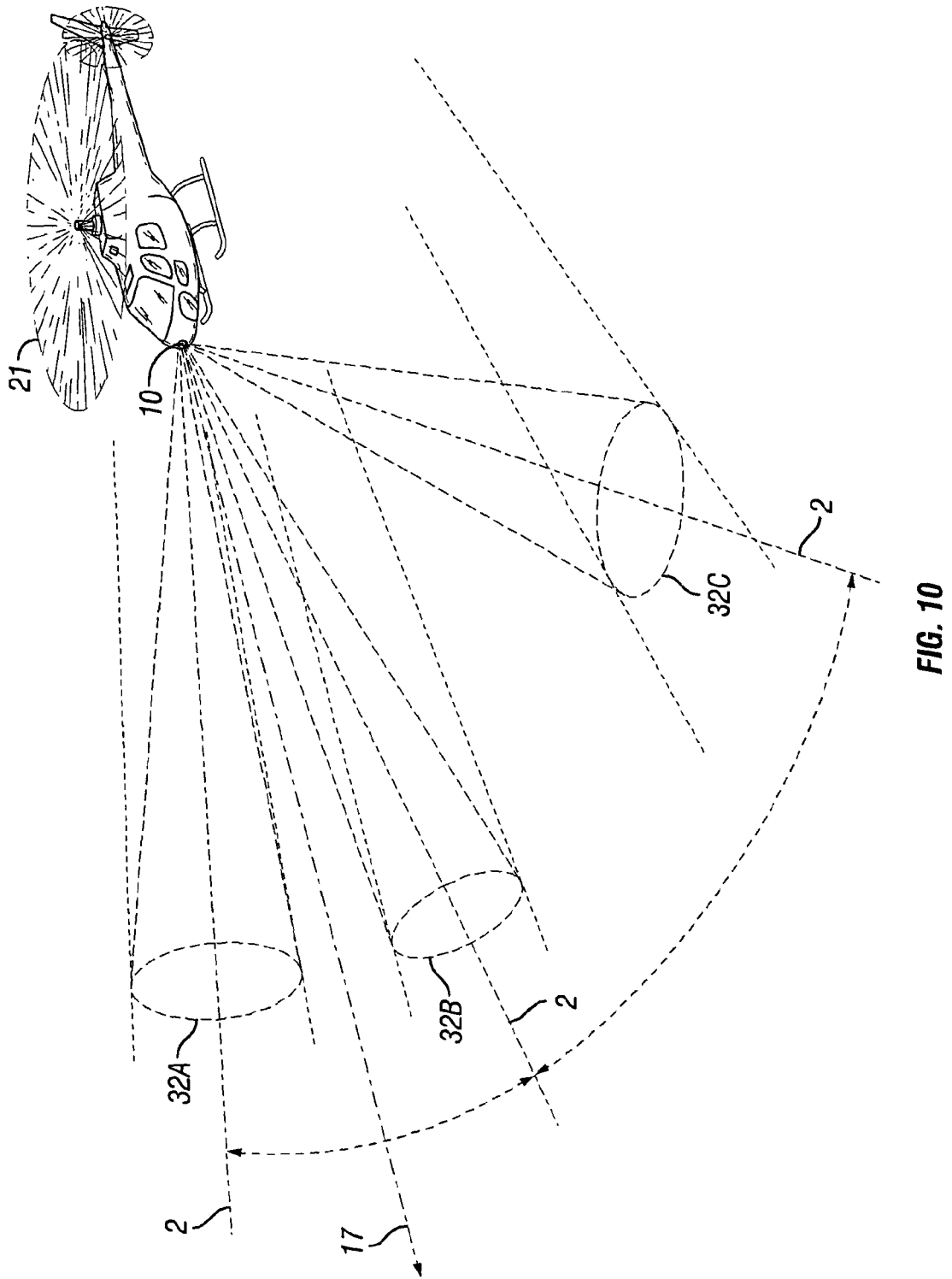

FIG. 10 is a diagram of a laser scanning system according to the invention on a helicopter, with multiple cone scanning lasers used at different angles.

Figure 11:
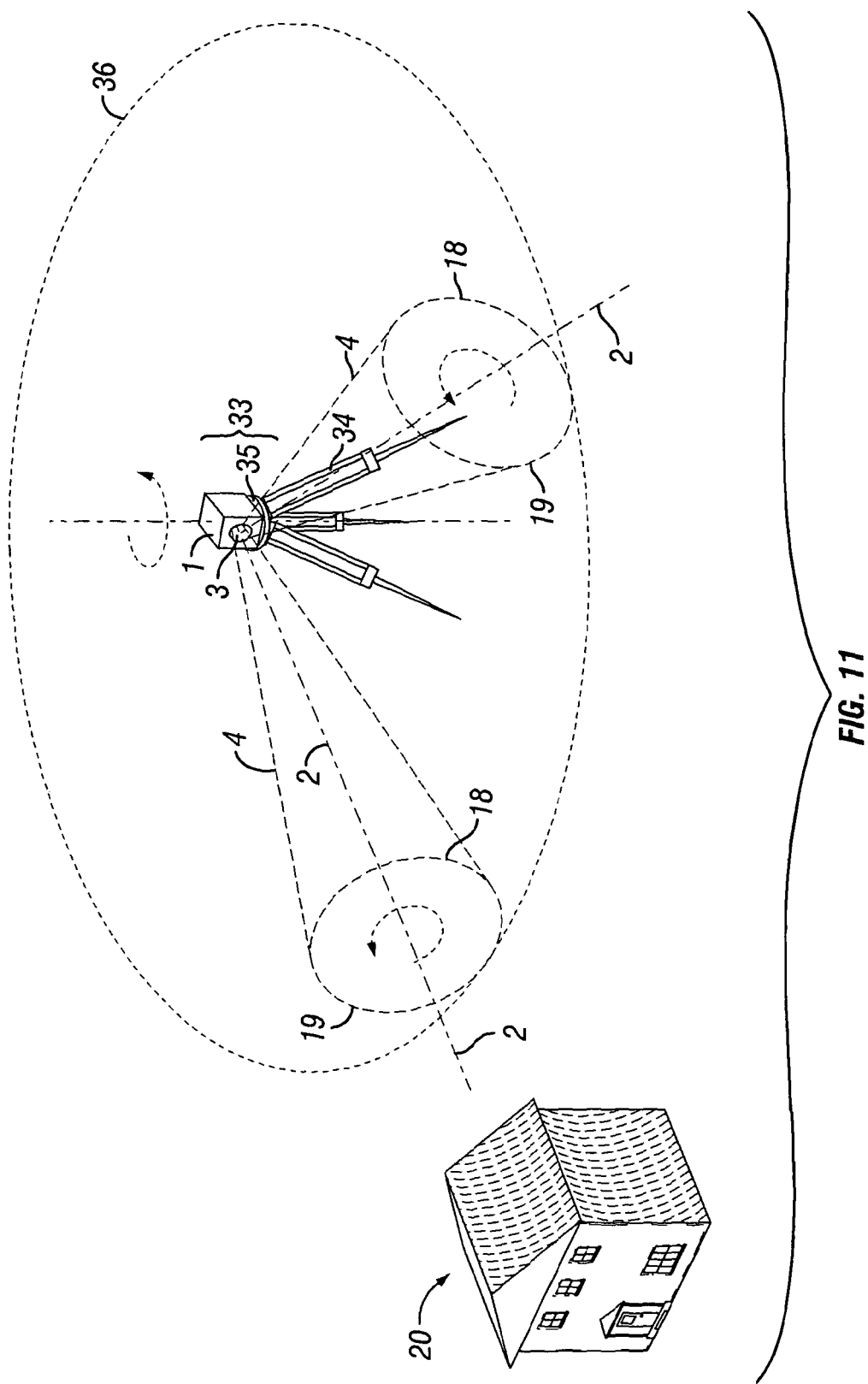

FIG. 11 is a diagram of a laser scanning system according to the invention mounted on a tripod with a rotating mechanism having a panning range of 360 degrees.

Figure 12:
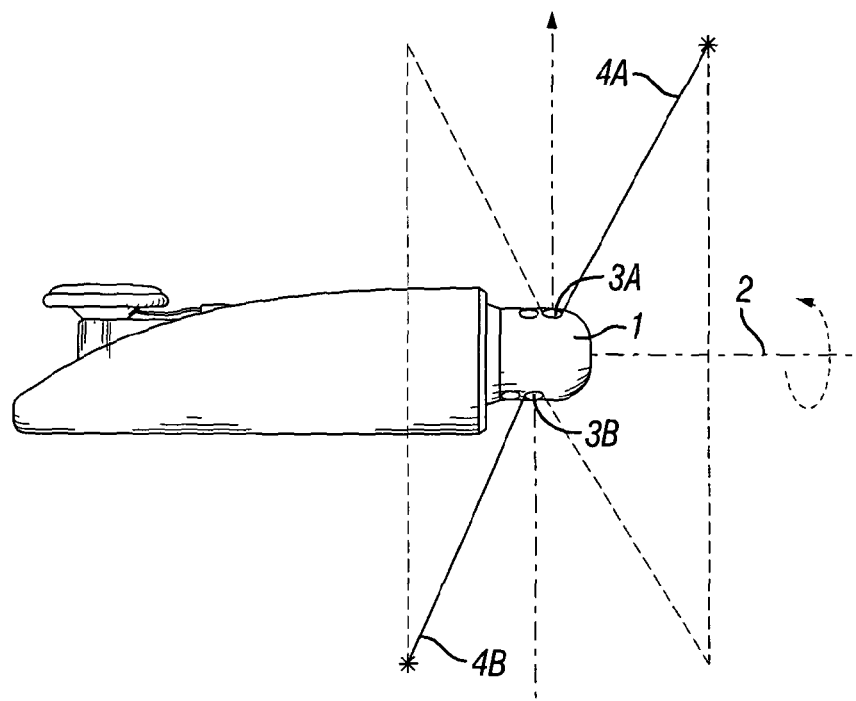

FIG. 12 is a diagram of a multi-laser cone scanning laser system according to the invention in which two lasers rotate about one axis of rotation.

Figure 13:
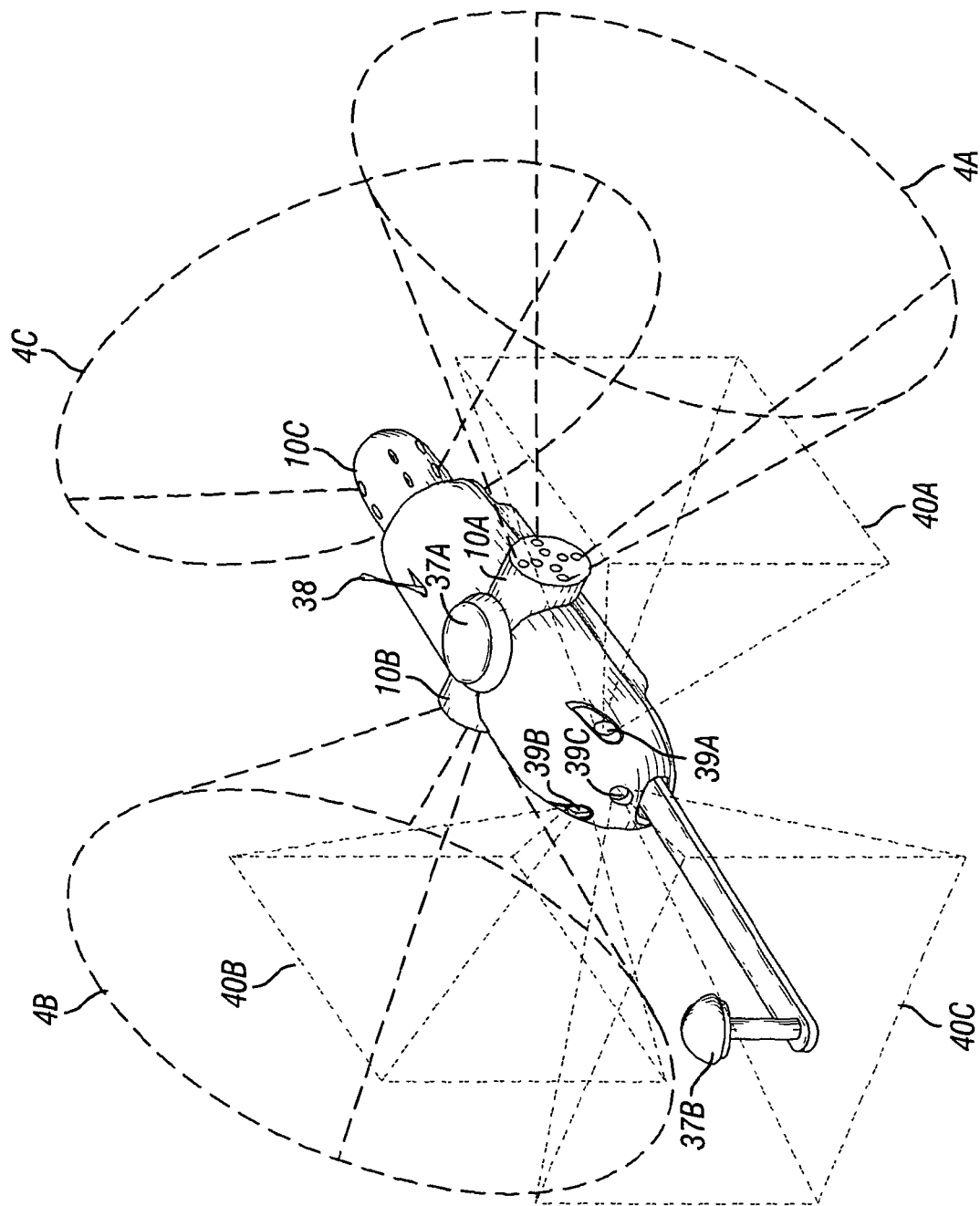

FIG. 13 is a multihead, multi-laser cone scanning system according to the invention.

Figure 14:
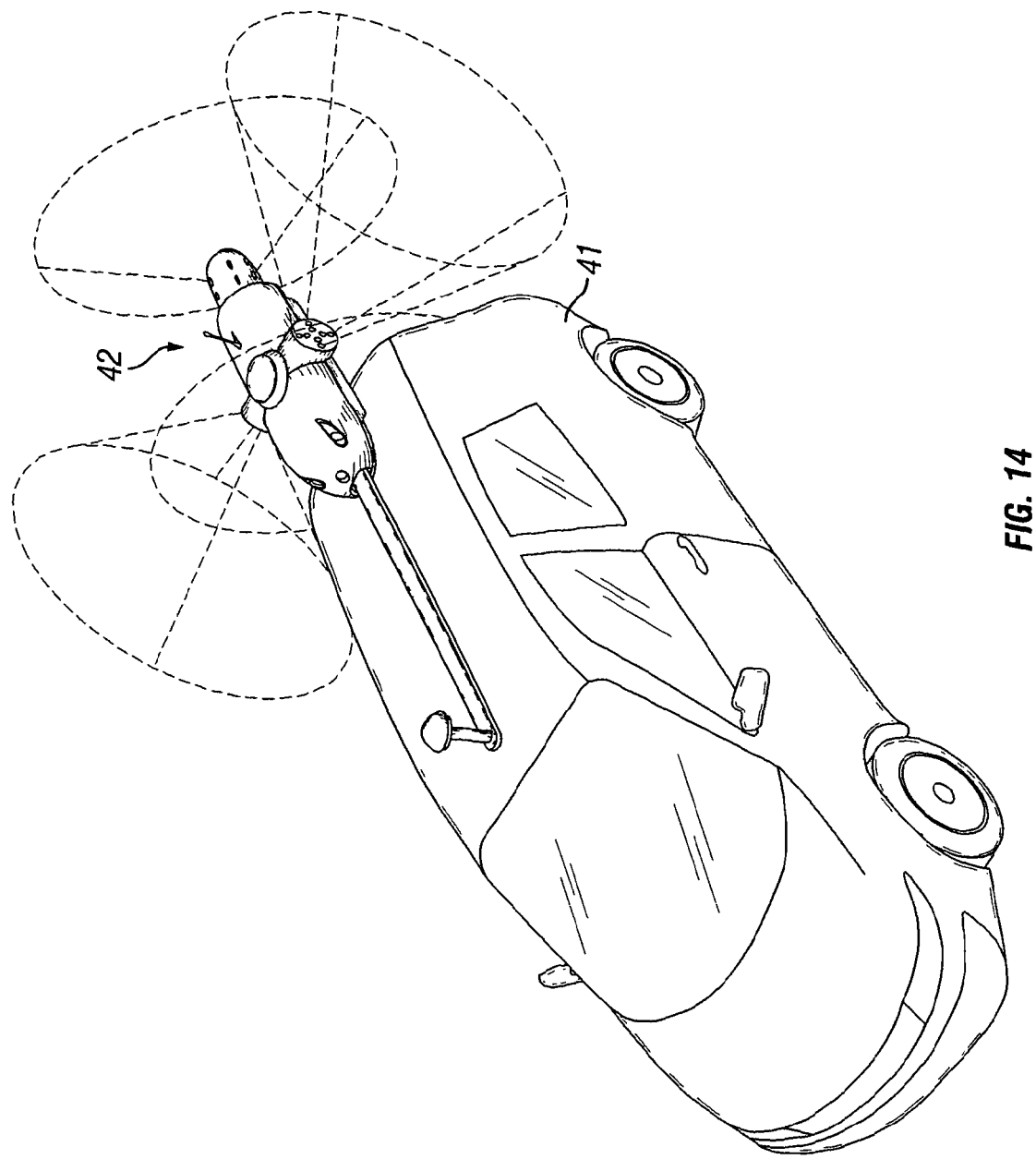

FIG. 14 is a diagram of a multihead, multilaser cone scanning system according to the invention mounted on a ground motor vehicle.

Figure 15:
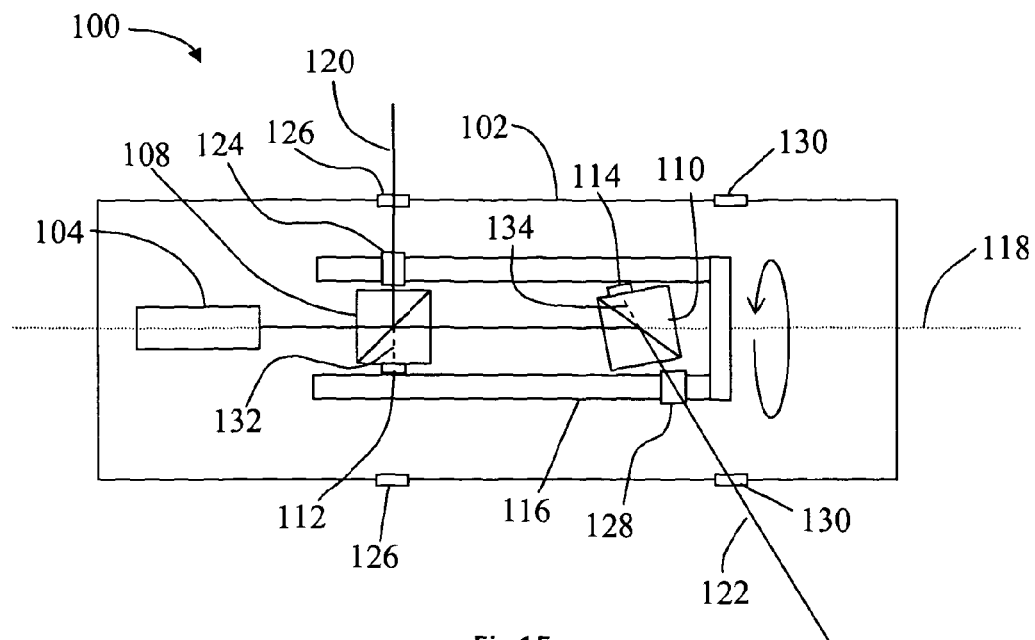

FIG. 15 is a diagram of an apparatus according to the invention in which one laser is provided from which two laser beams are generated and emitted from the housing.

Figure 16:
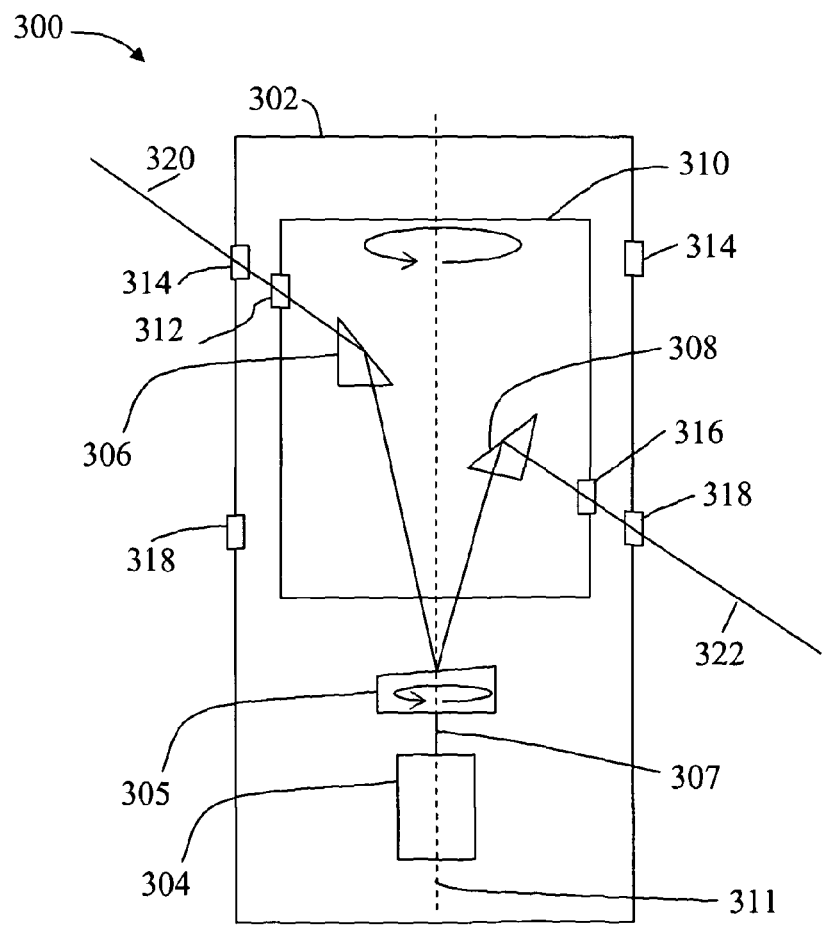

FIG. 16 is a diagram of an apparatus according to the invention in which one laser source is provided from which two laser beams are generated and emitted from the housing, and in which one detector is provided for detecting backscattering of both beams emitted from the housing.

While the invention is susceptible to various modifications and alternative forms, specific embodiments have been shown by way of example in the drawings and will be described in detail herein. However, it should be understood that the invention is not intended to be limited to the particular forms disclosed. Rather, the intention is to cover all modifications, equivalents and alternatives falling within the spirit and scope of the invention as defined by the appended claims.

A novel cone scanning laser system and methods for its use are provided. "Cone scanning" is a term used herein to refer to a method of operating a laser scanning system whereby, as described and according to some embodiments, a laser is positioned at an angle within a rotating housing (for example) such that the path of the laser beam forms a cone as the housing moves about its axis of rotation. The system does not necessarily include a tilt mechanism, thereby simplifying its design and reducing the number of moving parts. The cone scanning laser system and method described herein allow users to make laser measurements, for example, to detect and describe objects or topography in three dimensions.

The term "laser scanning system" as used herein is also commonly referred to in the industry by the term LiDAR (light detection and ranging). In example embodiments of the system and method according to the invention, the cone scanning angle measurements are determined using optical encoders or other similar means of measuring rotation angle triggered by the laser pulses on emission and return. Collected cone scanning laser and angle data can be registered and time tagged together with the navigation and attitude data to determine the 3D coordinates of the laser point clouds which are processed (real time or by later post processing) to produce 3D images or maps.

Figure 1:
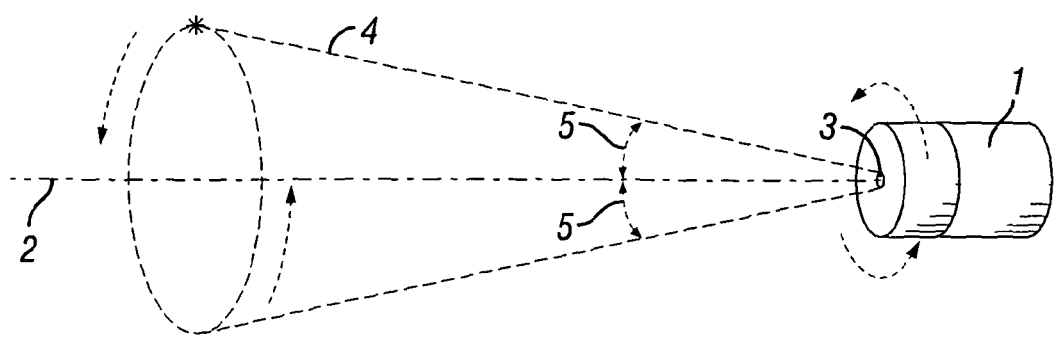
FIG. 1 is a diagram of an embodiment of a cone scanning laser system with a single laser.

The basic unit of the cone scanning laser system is shown in FIG. 1. A housing unit 1 is provided that can rotate about an axis 2, also referred to herein as its axis of rotation. A laser 3 is positioned within the housing at an angle such that the path of its laser beam 4 is in the shape of a cone. The position of the laser 3 within the housing 1 may be fixed or variable. In the case of a variable laser, the position of the laser 3 can be adjusted such that the angle of its laser beam 5 can be increased or decreased. During scanning, the movement of the housing 1 is limited to its rotation around its axis 2. In other words, the cone scanning laser system does not employ a tilt mechanism. By avoiding the tilt mechanism, the cone scanning laser system has a simpler, more robust design.

Figure 2:
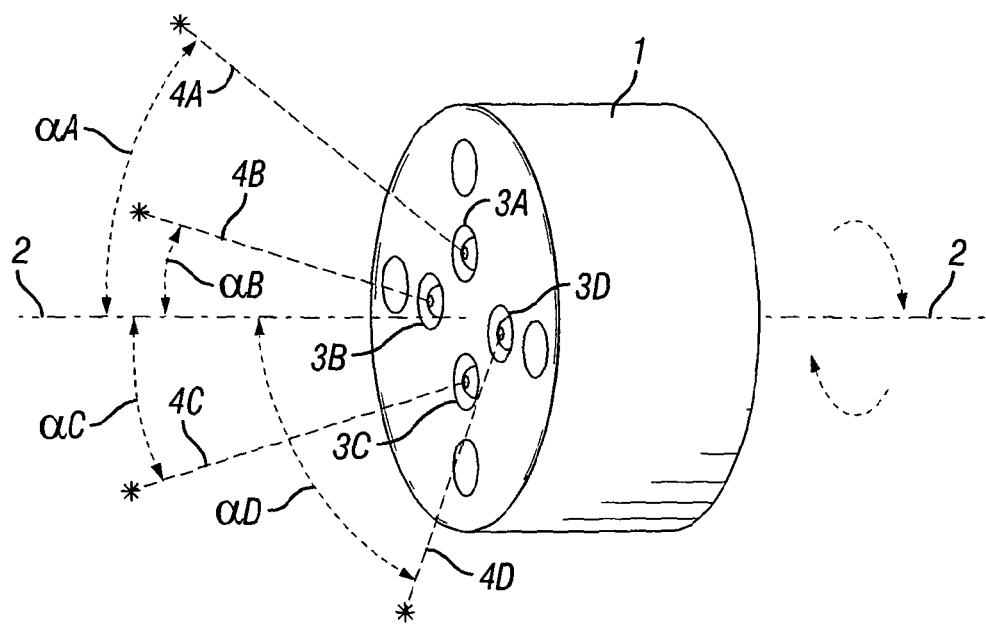
FIG. 2 is a diagram of a preferred embodiment of a laser scanning system is according to the invention with multiple lasers positioned at different angles relative to the axis of rotation.

Another embodiment of the invention is a cone scanning laser system comprising two or more lasers held within a rotating housing. At least one of the lasers is positioned such that it is transmitted at an angle. As the housing rotates, the path of the angled laser beam is in the shape of a cone. Such a cone scanning laser device can have a number of different configurations. An embodiment of the multi-laser cone scanning system is shown in FIG. 2. A housing 1 that is capable of rotating around its axis 2 holds four lasers 3A, 3B, 3C, 3D, which are held in different positions within the housing. The lasers 3A, 3B, 3C, 3D each project a laser beam 4A, 4B, 4C, 4D at different angles $\alpha A$, $\alpha B$, $\alpha C$ and an relative to the axis of rotation 2. The laser beams 4A, 4B, 4C, 4D each describe a different conical path (in space), as the housing rotates about its axis 2. Each of the laser beams are caused to rotate by the rotation of the housing and therefore all rotate about the same axis of rotation, i.e. about a common axis of rotation. The lasers may operate simultaneously, or the operator may have the ability to select a laser or lasers to operate at certain times. Sensors in the housing detect the backscattering of the laser beams 4A, 4B, 4C, 4D by objects in the vicinity of the cone scanning laser system. For each laser beam, a processor (or processors) determines the time taken for the laser beam to be reflected by an object back to the detector and thereby can calculate the distance to the object. This is done continuously as the laser beam is scanned about the axis of rotation. In some embodiments, a processor can collate all the measurement data obtained via all of the laser beams and tie them together. This data, along with information about the location and direction of emission of the laser beams (e.g. from position and orientation instrumentation in the housing, and a rotary encoder which monitors the angular orientation of the housing at it rotates) enables the processor to create a cloud of measurement data points which is representative of the cone scanning laser system's surrounding topography.

Another example of a cone scanning laser system according to the invention with multiple lasers is shown in FIG. 3. A housing 1 that is capable of rotating around its axis 2 holds three lasers 3A, 3B, 3C, which are held in different positions within the housing. The lasers 3A, 3B, 3C each project a laser beam 4A, 4B, 4C at different angles $\alpha A$, $\alpha B$, $\alpha C$. The lasers may operate simultaneously, or the operator may have the ability to select a laser or lasers to operate at certain times. In FIG. 3, first laser 3A is positioned at an upward angle $\alpha A$, a second laser 3B is positioned at a horizontal angle $\alpha B$, and a third laser 3C is positioned at a downward angle $\alpha C$ relative to the vertical axis of rotation 2. In a preferred embodiment, the upward angle is about 45 degrees, the horizontal angle is about 90 degrees, and the downward angle is about 130 degrees, relative to the vertical axis of rotation. Accordingly, the laser beams 3A, 3B, 3C each describe a different conical path (in space), as the housing rotates about its axis 2. Each of the laser beams are caused to rotate by the rotation of the housing and therefore all rotate about the same axis of rotation, i.e. about a common axis of rotation. As with the embodiment shown in FIG. 2, sensors in the housing detect the backscattering of the laser beams 4A, 4B, 4C, by objects in the vicinity of the cone scanning laser system, the data from which can be used to build a cloud of measurement data points which is representative of the cone scanning laser system's surrounding topography. As will be understood, in an alternative embodiment, each of the laser beams 4A, 4B, 4C could be emitted at an angle perpendicular to the axis of rotation such that they each rotate in a plane as they move about the axis of rotation.

FIG. 4 shows the cone scanning laser system of FIG. 3 in an operation to detect and describe the topography of an underground cavity 9. The cone scanning laser device 10 is attached to the end of a boom 11, which is lowered into an underground cavity 9 through a borehole 12. The cone scanning laser system 10 operates to determine the topography of the cavity 9 and produce a 3D map of the cavity as it is lowered from start position 13 to end position 14. In that operation, the three lasers 3A, 3B, 3C are able to scan different parts of the cavity based on their angled position within the housing 1. The top laser 3A is fixed at an upward angle (approximately 45 degrees from vertical axis 2) the path of its laser beam 4A forms a cone that can scan the area at the top of the cavity 6, particularly when the cone scanning laser device is positioned at the bottom of the cavity 14. The middle laser 3B is fixed at an angle perpendicular to the axis 2 of the rotating housing 1 (approximately 90 degrees from vertical axis 2) and the path of its laser beam 4B can scan the area along the walls of the cavity 7. The lower laser 3C is fixed at a downward angle (approximately 135 degrees from vertical axis 2) and the path of its laser beam 4C forms a cone that can scan the area at the bottom of the cavity 8, particularly when the cone scanning laser system is positioned at the top of the cavity 13. The use of the three cone scanning lasers 3A, 3B, 3C provides superior scanning ability and virtually eliminates blind spots to the scanning system. The housing may also contains one or more IR illuminators 15 and one or more cameras 16. The housing further contains a motor drive assembly to rotate the housing 1.

Additionally, because the housing only rotates around its axis 2 and does not pivot relative to that axis (i.e., no tilt mechanism), there are fewer moving parts that a system such as the CAL-S system. The cone scanning system is also lighter, more efficient, more water tight, more robust, and more economical to produce due to its simpler design. Because it is lighter, the mechanism for lowering the laser head into the cavity can be lighter, for example, by using carbon rods, and therefore suitable for lowering or pushing into voids at any angle. The navigation system can be the same navigation systems as used for C-ALS or any other such system known to those of ordinary skill in the art. The navigation system should measure orientation, pitch and roll to compensate for any bending or flexure of the lowering rods once the laser head 10 enters the void 9.

As another embodiment of the present invention, is a mobile cone scanning laser system that detects and describes objects or topography in three dimensions. A particular example of a mobile laser scanning system is a cone scanning laser system attached to a land, sea or air vehicle. In the context of this invention, the moving vehicle can be any land, sea or air vehicle, including but not limited to an airplane, helicopter, automobile, motorcycle, military vehicle or boat. For example, FIG. 5 depicts a motor vehicle 17 traveling in direction 17A and a cone scanning laser system 10 with a rotating housing. Targets 20 are swept by both sides of the cone creating a variable line scan. All surfaces are scanned from two directions in each pass one from the leading edge of the cone 18 and the other from the trailing edge of the cone 19.

A mobile cone scanning laser system according to the invention may also be used in a preferred embodiment as depicted in FIG. 6. A helicopter 21 has a cone scanning laser system 10 attached to the front of its body. The cone-shaped path of the laser beam emitted from the laser scanning system can detect an obstacle such as a cable suspended in the air 22. As the low flying helicopter 21 moves from position A to position B and approaches the cable 22, two signals for each scan are received—one from each side 4A and 4B of the cone scan. The targets move progressively closer together as the cone narrows on approach. This alerts the pilot that he is in fact seeing a cable as opposed to a random noise. A line of points are progressively generated on the pilots monitor allowing time for averting the cables. Simultaneously, ground profiles are generated on approach to the cable 22 giving longitudinal and ground clearance indications.

In contrast to the cone scanning laser system according to the invention, conventional aircraft line scanners, as shown in FIG. 7, only survey linear/downward swaths. Two or more passes may be needed to obtain the data from the non-conical lower beam path 4.

The cone scanning laser system according to the invention as shown in FIG. 8 demonstrates that as an aircraft 21 moves from position 23 to 24, the leading edge of the cone scan 25A surveys the target object 30 including the vertical side from point 27 to point 29 and the trailing edge 26B surveys the target object 30 including the vertical side from point 29 to point 28.

In another embodiment according to the invention shown in FIG. 9, an aircraft 21 has a cone scanning laser system 10 with a variable cone angle. By varying the cone angle 5A, 5B, 5C, the size of the cone-shaped laser path is changed 4A, 4B, 4C and a narrow or wide swath of territory can be covered. A variable cone angle mechanism may also be used to maintain a constant swath as the height of the aircraft varies due to terrain undulations.

In another embodiment shown in FIG. 10, an aircraft 21 contains a cone scanning laser system 10 with multiple cone scanning lasers, each having a different axis of rotation 2. The path of the cone scans 32A, 32B and 32C provide lateral, forward and downward cone scanning capabilities. Such cone scanning with multiple lasers can provide efficient, fast and accurate scanning of difficult terrain, including steep hillsides, power cable routes and enable cable collision avoidance.

In another embodiment, a cone scanning laser system according to the invention can be mounted on a support with a rotating mechanism that can pan up to 360 degrees. For example, FIG. 11 is a diagram of a cone scanning laser system 33 mounted on a tripod 34 containing a rotating mechanism 35 with a pan range of 360 degrees 36. The cone scanning laser system 33 has a housing 1 containing a laser 2 and rotates about its axis 2. The cone scanning laser system 33 further moves as the rotation mechanism 35 on the tripod 34 moves about its axis.

FIG. 12 is a diagram of a multi-laser cone scanning laser system, in which two lasers rotate about one axis of rotation. This system is similar to the Dynascan System produced by Measurement Devices Ltd., except that the laser scanning system is a multi-laser cone scanning laser system according to the invention. That laser system contains a housing 1 that moves about an axis of rotation 2. The housing contains two lasers 3A and 3B positioned at different angles within the housing such that they project laser beams at different angles in the shape of cones 4A and 4B as the housing moves about its axis of rotation. Both of the laser beams 4A, 4B are caused to rotate by the rotation of the housing 1 and therefore both rotate about the same axis of rotation, i.e. about a common axis of rotation.

FIG. 13 is a system according to the invention much like FIG. 12, except that it contains three cone scanning laser units 10A, 10B, 10C, and three integrated camera units 39A, 39B, 39C. The cone scanning laser units project cone-shaped laser beam paths 4A, 4B, 4C, and the cameras can capture images at different positions 40A, 40B, 40C. The system further contains GPS antennas 37A, 37B, an RTK radio antenna 38, and an inertial measurement unit such as a gyroscope within the system. Due to the cone scanning laser system, the resulting 3D images prepared from the scans do not have significant occlusions or black areas because the scanning plane is not limited to the normal direction of travel.

FIG. 14 is a diagram of the system according to FIG. 13 (42) mounted on a ground vehicle 41.

FIG. 15 shows another alternative embodiment of the invention. In this embodiment, the cone scanning apparatus 100 comprises a housing 102 comprising a laser source 104, a first beam splitter 108 a second beam splitter 110 and first 112 and second 114 detectors. The first 108 and second 110 beam splitters are mounted to a rotation unit 116 in the housing which can rotate about an axis 118 within the housing. The first 108 and second 110 beam splitters therefore rotate with the rotation unit 116. Furthermore, the first 112 and second 114 detectors are fixed to their respective first 108 and second 110 beam splitters and hence rotate with the rotation unit 116 also. In use, the laser source 104 emits a beam 106 along the rotation unit's 116 rotational axis 118 toward the first beam splitter 108 from which part of the beam 106 continues toward the second beam splitter 110 and part is split to create a first measuring beam 120 which leaves the housing 102 via a first rotation unit window 124 and a first annular housing window 126, normal to the rotational axis 118. As shown in FIG. 15, the second beam splitter 110 diverts the beam 106 to create a second measuring beam 122 which leaves the housing 102 via a second rotation unit window 128 and a second annular housing window 130, at a non-perpendicular angle to the rotational axis 118. Reflections of the first measuring beam 120 by objects back along the first measuring beam direction (e.g. backscattered light from the first measuring beam) are detected by the first detector 112 (as partially illustrated by dashed line 132) and reflections of the second measuring beam 122 by objects back along the second measuring beam direction (e.g. backscattered light from the second measuring beam) are detected by the second detector 114 (as partially illustrated by dashed line 134). The output of the detectors is used to determine the time-of-flight to the point on the object that caused the backscattering of the light beam and therefore determine its distance from the object. For instance, the output of the detector is passed to a processor device (not shown) which calculates the time-of-flight and/or distance to the object. In use, a motor (not shown) continuously rotates the rotation unit 116 about its rotational axis 118 and so therefore the first measuring beam 120 rotates about the rotational axis 118 in a plane and the second measuring beam 122 rotates about the rotational axis 118. Accordingly, the first measuring beam 120 sweeps around the rotation axis 118 in a plane and the second measuring beam 122 sweeps around the rotation axis 118 in the shape of a cone. As will therefore be understood, each of the first 120 and second 122 laser beams are caused to rotate by the rotation of the rotation unit 116 and therefore both rotate about the same axis of rotation 118, i.e. about a common axis of rotation.

As will be understood, the above described embodiment could be modified such that the first 120 and second 122 measuring beams each describe cones as they rotate about the rotational axis 118. Alternatively, the above described embodiment could be modified such that the first 120 and second 122 measuring beams each rotate in planes (e.g. parallel planes) as they rotate about the rotational axis 118. Furthermore, first and second laser sources mounted to the rotation unit 116 (e.g. with at least one of them and optionally at least both of them angled such that their beam emits at a non-perpendicular angle to the axis of rotation) could be used instead of a single laser source and first and second beam splitters. Further still, additional and/or alternative optical components, such as mirrors, half-silvered mirrors, prisms, corner cubes, opto-electric crystals and the like could be used to control the path of beams emitted from the housing. As will also be understood, the cone laser scanning apparatus could be configured to emit three or more lasers from the housing by suitably arranged lasers and/or optical components.

In the embodiment of FIG. 15 each laser beam emitted from the housing has a corresponding detector for detecting reflection of the beam from an object. Referring to FIG. 16 there is shown an embodiment of a cone laser scanning apparatus 300 in which there is a common shared detector for each laser beam emitted from the housing 302. In particular, there is a single laser source and detector unit 304, a rotatable refractive optic component 305, first 306 and second 308 mirrors (in the form of prisms) which are mounted within and fixed relative to a rotation unit 310 which is rotatable within the housing 302. In use the laser source and detector unit 304 emits a beam 307 toward the refractive optic component 305. The refractive optic component 305 causes the beam to refract and therefore change direction. The refractive optic component 305 is caused to continuously rotate by a motor (not shown) about a rotational axis 311 and is configured such that the beam is alternately directed toward the first 306 and second 308 prisms, which respectively direct the beam out of housing via first 312 and second 316 rotation unit windows and first 314 and second 318 annular housing windows. The path of the beam in each of these states is illustrated by lines 320 and 322 in FIG. 16. The rotation unit 310 is itself rotated by a motor (not shown) about the rotation axis 311 at a different rate to that of the rate of rotation of the refractive optic component 305, e.g. at a slower rate. Accordingly, as a result, the alternately emitted beams 320, 322 are each caused to rotate by the rotation unit 310 about the same axis of rotation 311, i.e. a common axis of rotation, in a manner that describes first and second conical paths. The light beams will be reflected by an object(s) in the vicinity of the cone laser scanning apparatus 300 back along the same path and such backscattered light will be detected by the laser source and detector unit 304. The laser source and detector unit 304 is synchronised with the rotating refractive optic component 305 such that backscattered light from the beam emitted through the path through the first rotation unit window 312 and first annular housing window 314 can be distinguished from backscattered light from the beam emitted through the second rotation unit window 316 and second annular housing window 318. The output of the detector can be used in similar ways as described above, e.g. to determine the distance to objects and for example to generate a 3D topographical map of the scanned volume. Like with the other above described embodiments, the apparatus of FIG. 16 could be configured such that the first 320 and second 322 measuring beams are each contained in a plane (e.g. parallel planes) as they rotate about the rotational axis 118.

In the embodiment shown the conical paths face in opposite directions but as will be understood this need not necessarily be the case. E.g. they could face in the same direction but take different conical paths, like that shown in FIG. 2.

Besides the above embodiments related to the cone scanning laser system, the invention may be further employed in numerous methods of conducting a cone scanning operation to obtain information and 3D images of any object or topography.

In another preferred embodiment is a safe method of determining the presence or volume of any material by scanning an area potentially containing the material with a cone scanning laser system according to the invention. In a preferred embodiment, the material is a toxic substance, unknown substance, radioactive material, radioactive waste, flammable material, explosive material, chemically reactive material, controlled substance or fluid leakage.

The material of interest can be safely investigated by inserting a cone scanning laser system according to the invention into an opening or borehole and used to identify and obtain a 3D image of the contents of the cavity. In a preferred embodiment, the opening or borehole is of minimal size to avoid leakage of the material or a byproduct of the material through the opening or borehole.

Information gathered from any stationary or mobile cone scanning laser system or method according to the invention may be further used to prepare or provide location information, maps, terrain data, volumetric measurements, other navigation or route guidance. The information may also provide images of buildings, structures, landforms, terrain, geographic formations, waterways, natural resources, or other objects. The information may further be used to identify traffic patterns, boundaries, obstacles, road conditions or events. That information may also be used to identify the presence, approach or retreat of moving objects, weapons, vehicles, persons, or animals.

Other advantages of the stationary or mobile cone scanning laser scanning system or methods according to the invention include the ability to provide a cone scanning laser system that is, relative to existing laser scanning systems, more accurate, fast, reliable, lightweight, economical, robust, and/or watertight. Preferably the cone scanning laser system has a simpler design, e.g., through the use of fewer angles of rotation for the laser housing.

All of the embodiments of the present invention disclosed and claimed herein can be made and executed without undue experimentation in light of the present disclosure. While the embodiments of the present invention have been described in terms of preferred embodiments, it will be apparent to those of skill in the art that variations can be applied to the compositions and/or methods and in the steps or in the sequence of steps of the methods described herein without departing from the concept, spirit and scope of the invention.

The invention claimed is:

1. A laser scanning apparatus for detecting and describing an object or topography in three dimensions, the apparatus comprising a housing that includes at least one laser, the apparatus being configured to emit at least a first laser beam and a second laser beam from the housing and to rotate the first laser beam and the second laser beam about a common axis of rotation, wherein:
   a path of the first laser beam forms a shape of a first cone when the first laser beam rotates about the common axis of rotation,
   a path of the second laser beam forms a shape of a second cone when the second laser beam rotates about the common axis of rotation, and
   the first cone and the second cone face in opposite directions.

2. The laser apparatus, as claimed in claim 1, in which the at least first and second laser beams are rotationally fixed relative to each other.

3. The laser apparatus, as claimed in claim 1, in which the housing is rotatable about an axis of rotation, and the at least first and second laser beams are configured to rotate with the housing.

4. The laser apparatus, as claimed in claim 3, in which the at least first and second lasers are positioned in the housing at an angle such that the path of their laser beams are each in the shape of a cone when the housing moves about its axis of rotation.

5. The laser apparatus, as claimed in claim 1 that is configured to process reflected or backscattered beams from surroundings in which the apparatus is located to determine a series of measurements relating to a distance between the apparatus and the surroundings, and to use the measurements, together with information associated with each measurement relating to an emission position and direction of the laser beam used for the measurement to create a cloud of measured points representing the topography of the surroundings.

6. The laser apparatus, as claimed in claim 5, in which the apparatus is configured to tie together measurements obtained from the detection of the reflection or backscattering of each of the at least first and second beams.

7. The laser apparatus, as claimed in claim 5, in which the apparatus is configured to generate from the cloud of measurement points a 3D model, map or image of the surroundings in which the apparatus is located.

8. The laser apparatus, as claimed in claim 1, in which each of the at least first and second laser beams is configured to rotate about a common bearing.

9. The laser apparatus, as claimed in claim 1, in which each of the at least first and second laser beams is caused to rotate about the common axis of rotation by a common rotation device.

10. An apparatus as claimed in claim 1, in which the first and second laser beams are projected at an acute angle between 80° and 5° relative to the common axis of rotation.

11. An apparatus as claimed in claim 1, in which the first and second laser beams are projected at an acute angle between 70° and 10° relative to the common axis of rotation.

12. An apparatus as claimed in claim 1, in which the first and second laser beams are projected at an acute angle between 60° and 20° relative to the common axis of rotation.

13. An apparatus as claimed in claim 1, mounted to means for linearly moving the housing in a direction substantially parallel to the axis of rotation.

14. A laser scanning system comprising a laser scanning apparatus as claimed in claim 1 mounted to means for moving the laser scanning apparatus during a scanning operation for detecting and describing an object or topography in three dimensions.

15. A laser scanning system as claimed in claim 14, wherein one of the first and second laser beams describes a forward facing cone and the other describes a rearward facing cone relative to a direction of travel.

16. A laser scanning system as claimed in claim 14, wherein at least one of the laser beams describes a sideways facing cone.

17. A laser scanning system as claimed in claim 14, wherein the common axis of rotation of the first and second laser beams is arranged substantially parallel to a direction of travel.

18. A laser scanning system as claimed in claim 14, wherein the means for moving the laser scanning apparatus comprises a vehicle, such as an airplane, helicopter, automobile, motorcycle, military vehicle or boat.

19. A laser scanning system as claimed in claim 14, wherein the means for moving the laser scanning apparatus comprises a boom.

20. The laser apparatus, as claimed in claim 1, wherein:
   the first laser beam is projected at an angle to the common axis of rotation; and
   the second laser beam is projected at an angle to the common axis of rotation.

21. The laser apparatus, as claimed in claim 1, wherein:
   the first laser beam is projected at a non-perpendicular angle to the common axis of rotation, and
   the second laser beam is projected at a non-perpendicular angle to the common axis of rotation.

22. The laser apparatus, as claimed in claim 1, wherein:
   the first laser beam is projected at a constant angle to the common axis of rotation, and
   the second laser beam is projected at a constant angle to the common axis of rotation.

23. A method of scanning using a laser scanning apparatus comprising a housing from which at least first and second beams are emitted from the housing, the method comprising:
   rotating the at least first and second beams about a common axis wherein:
      the first and second beams define a first and second conical path, respectively,
      the first conical path forms a shape of a first cone when the first laser beam rotates about the common axis of rotation,
      the second conical path forms a shape of a second cone when the second laser beam rotates about the common axis of rotation, and
      the first and second conical paths face in opposite directions.

24. A method as claimed in claim 23, in which the method comprises rotating the housing so as to rotate the at least first and second beams about the common axis.

25. A method as claimed in claim 23, comprising:
   processing reflected or backscattered beams from the surroundings in which the apparatus is located to determine a series of measurements relating to the distance between the apparatus and the surroundings, and
   using the measurements, together with information associated with each measurement relating to an emission position and direction of the laser beam used for that measurement, to create a cloud of measurement points representing the topography of the surroundings.

26. The method as claimed in claim 23, further comprising linearly moving the housing in a direction substantially parallel to the axis of rotation.

27. A method of detecting and describing an object or topography in three dimensions, comprising:
   moving a laser scanning apparatus past the object or topography, wherein the laser scanning apparatus projects at least one laser beam at an angle relative to the direction of travel so as to extend in both forward and backward directions relative to the direction of travel as the laser scanning apparatus moves past the object or topography so as to obtain data relating to both front and rear faces or surfaces of the object or topography in a single pass, and
   using the data to generate a 3D model, map or image of the object or topography, wherein the laser scanning apparatus either projects at least a first laser beam and a second laser beam, one in the forward direction and another in the backward direction, or projects a single beam that moves between the forward and backward directions, wherein when the laser scanning apparatus projects the first laser beam and the second laser beam:
   a path of the first laser beam forms a shape of a first cone when the first laser beam rotates about the common axis of rotation;
   a path of the second laser beam forms a shape of a second cone when the second laser beam rotates about the common axis of rotation; and
   the first cone and the second cone face in opposite directions.

28. A method as claimed in claim 27, wherein the single beam moves between the forward and backward directions in a fan beam pattern.

29. A method as claimed in claim 27, wherein the single beam moves between the forward and backward directions in a cone beam pattern.

30. A laser scanning system for detecting and describing an object or topography in three dimensions, comprising:
   a vehicle or a boom that moves a laser scanning apparatus past the object or topography, wherein the laser scanning apparatus is arranged to project at least a first laser beam and a second laser beam at an angle relative to the direction of travel so as to extend in both forward and backward directions relative to the direction of travel as the laser scanning apparatus moves past the object or topography so as to obtain data relating to both front and rear faces or surfaces of the object or topography in a single pass, and
   a processor that processes the obtained data to generate a 3D model, map or image of the object or topography, wherein:
   the first laser beam and the second laser beam rotate about a common axis of rotation,
   a path of the first laser beam forms a shape of a first cone when the first laser beam rotates about the common axis of rotation,
   a path of the second laser beam forms a shape of a second cone when the second laser beam rotates about the common axis of rotation, and
   the first cone and the second cone face in opposite directions.

* * * * *